United States Patent
Maetaki

(10) Patent No.: US 8,427,762 B2
(45) Date of Patent: Apr. 23, 2013

(54) OPTICAL SYSTEM AND OPTICAL APPARATUS INCLUDING THE OPTICAL SYSTEM

(75) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 13/110,549

(22) Filed: May 18, 2011

(65) Prior Publication Data

US 2011/0299179 A1 Dec. 8, 2011

(30) Foreign Application Priority Data

Jun. 2, 2010 (JP) .................................. 2010-126815

(51) Int. Cl.
*G02B 13/02* (2006.01)
*G02B 9/00* (2006.01)
*G02B 9/06* (2006.01)

(52) U.S. Cl.
USPC ............................. 359/754; 359/743; 359/794

(58) Field of Classification Search .......... 359/754–757, 359/759–760, 763, 764, 767, 769, 771, 772, 359/779, 780, 784, 791–794
See application file for complete search history.

(56) References Cited

U.S. PATENT DOCUMENTS

| 7,411,745 | B2 | 8/2008 | Wada |
| 8,000,035 | B2 * | 8/2011 | Harada .......................... 359/749 |
| 8,139,297 | B2 * | 3/2012 | Sudoh ........................... 359/793 |

FOREIGN PATENT DOCUMENTS

JP 5188286 A 7/1993

* cited by examiner

*Primary Examiner* — Thomas K Pham
*Assistant Examiner* — Brandi Thomas
(74) *Attorney, Agent, or Firm* — Canon U.S.A., Inc. IP Division

(57) ABSTRACT

An optical system includes, in order from an object side to an image side, a first lens unit having a positive refractive power, an aperture stop, and a rear lens group. In the optical system, the rear lens group includes a second lens unit configured to move during focusing. The first lens unit includes n positive lenses (n is an integer greater than 1) and one or more negative lenses. With an order of an optical member counted from the object side towards the image side being indicated by i (i is an integer equal to or greater than 1), a refractive index and an Abbe number of a material of an i-th positive lens of the first lens unit with respect to d-line light (Ndi, νdi), maximum and minimum values of the Abbe number νdi (max(νdi), min (νdi)), a minimum value of the refractive index Ndi (min (Ndi)), a focal length of the first lens unit (fp), and a focal length of the entire optical system (f) are appropriately set.

15 Claims, 13 Drawing Sheets

OPTICAL SYSTEM AND OPTICAL APPARATUS INCLUDING THE OPTICAL SYSTEM

BACKGROUND OF THE INVENTION

1. Field of the Invention

The present invention relates to an optical system and an optical apparatus including the optical system. In particular, the present invention relates to an optical system useful as a photographic optical system for an image pickup apparatus, such as a digital still camera, a digital video camera, or a silver-halide film camera.

2. Description of the Related Art

As a photographic optical system used in an optical apparatus, such as a digital camera or a video camera, a conventional middle focal length photographic optical system having a high aperture ratio of about 1.2 to 2.0 in F-number and a relatively long focal length has been used for shooting portrait images and indoor sport scenes. Current market preferences require that the photographic optical system of this type has a short total system length (i.e., the lens total length, which is the length from a surface of a first lens closest to the object plane to the image plane), that the photographic optical system is small-sized, and that the photographic optical system has a high optical performance.

In general, however, if the lens total length of a photographic optical system is reduced, chromatic aberration, such as axial chromatic aberration or chromatic aberration of magnification may increase. As a result, the optical performance may degrade. In particular, in a middle focal length telephoto lens or a long focal length telephoto lens, chromatic aberration may increase as the focal length is increased.

On the other hand, in a photographic optical system having a high aperture ratio and high brightness, the depth of field is shallow and the various aberrations greatly affect the image quality. Accordingly, if a photographic optical system like this is used, it is necessary to correct aberrations with a high accuracy.

As a conventional optical system, a middle telephoto photographic optical system having a high aperture ratio and a relatively long focal length has been used. Japanese Patent Application Laid-Open No. 05-188286 discusses a photographic optical system that uses a lens made of a middle dispersion glass material having a high refractive index to correct various aberrations, such as spherical aberration and curvature of field.

Furthermore, a telephoto lens, which has a front lens group including a lens made of an anomalous partial dispersion material, such as fluorite, to correct chromatic aberration, has been used. A telephoto lens discussed in U.S. Pat. No. 7,411,745 uses a lens made of a low dispersion material having a low refractive index to correct chromatic aberration.

A middle dispersion material having a high refractive index, which has an Abbe number of about 40 to 60 and a refractive index of about 1.6 to 1.8, generally has negative anomalous partial dispersion. Accordingly, if a lens made of the middle dispersion material is used as a lens having a positive refractive power, axial chromatic aberration may increase.

A low dispersion material having a high refractive index, which has an Abbe number of about 70 to 90 and a refractive index of about 1.4 to 1.5, generally has positive anomalous partial dispersion. Accordingly, if a lens made of the middle dispersion material is used as a lens having a positive refractive power, axial chromatic aberration can be appropriately corrected. However, because the refractive index is low, it is required to increase the curvature of the lens surface (a refractive surface) to achieve a desired level of refractive power. Accordingly, spherical aberration and curvature of field may easily occur.

Therefore, it is necessary to appropriately correct chromatic aberration and various aberrations, such as spherical aberration and curvature of field at the same time by appropriately setting the parameter in the material of the lens to achieve a high optical performance for the entire image plane. In particular, if a middle focal length lens, which has a high aperture ratio and a relatively long focal length, is used, it may become difficult to achieve a high optical performance for the entire image plane unless chromatic aberration and various aberrations, such as spherical aberration and curvature of field, are appropriately corrected.

SUMMARY OF THE INVENTION

The present invention is directed to an optical system capable of appropriately correcting various aberrations, such as chromatic aberration, and an optical apparatus including the optical system.

According to an aspect of the present invention, an optical system includes, in order from an object side to an image side, a first lens unit having a positive refractive power, an aperture stop, and a rear lens group. In the optical system, the rear lens group includes a second lens unit configured to move during focusing. The first lens unit includes n positive lenses (n is an integer greater than 1) and one or more negative lenses. Furthermore, in the optical system, when i (i is an integer equal to or greater than 1) an order of an optical member counted from the object side, Ndi and vdi are respectively a refractive index and an Abbe number of a material of an i-th positive lens of the first lens unit with respect to d-line light, max(vdi) and min(vdi) are respectively maximum and minimum values of the Abbe number vdi, min(Ndi) is a minimum value of the refractive index Ndi, fp is a focal length of the first lens unit, and f is a focal length of the entire optical system, the following conditions are satisfied:

$2.2 < \max(vdi)/\min(vdi)$ $\min(vdi) < 30.0$ $1.55 < \min(Ndi)$ $0.5 < fp/f < 3.7.$ According to another aspect of the present invention, an optical system includes, in order from an object side to an image side, a first lens unit having a positive refractive power, whose refractive surface closest to the image side has a concave shape facing the image side, an aperture stop, and a rear lens group. In the optical system, the rear lens group includes a second lens unit configured to move during focusing and whose refractive surface closest to the object side has a concave shape facing the object side. The first lens unit includes n positive lenses (n is an integer greater than 1) and one or more negative lenses. Furthermore, in the optical system, when i (i is an integer equal to or greater than 1) an order of an optical member counted from the object side towards the image side, vdi is an Abbe number of a material of an i-th positive lens of the first lens unit with respect to d-line light, max(vdi) and min(vdi) are respectively maximum and minimum values of the Abbe number vdi, Rp is a radius of curvature of the refractive surface of the first lens unit closest to the image side and having a concave shape facing the image side, and Rn is a radius of curvature of the refractive surface of the second lens unit closest to the object side and having a concave shape facing the object side, and f is a focal length of the entire optical system, the following conditions are satisfied:

$$2.2 < \max(vdi)/\min(vdi)$$

$$\min(vdi) < 30.0$$

$$0.15 < Rp/f < 0.90$$

$$-15.00 < Rn/f < -0.15.$$

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

DESCRIPTION OF THE EMBODIMENTS

Figure 1:
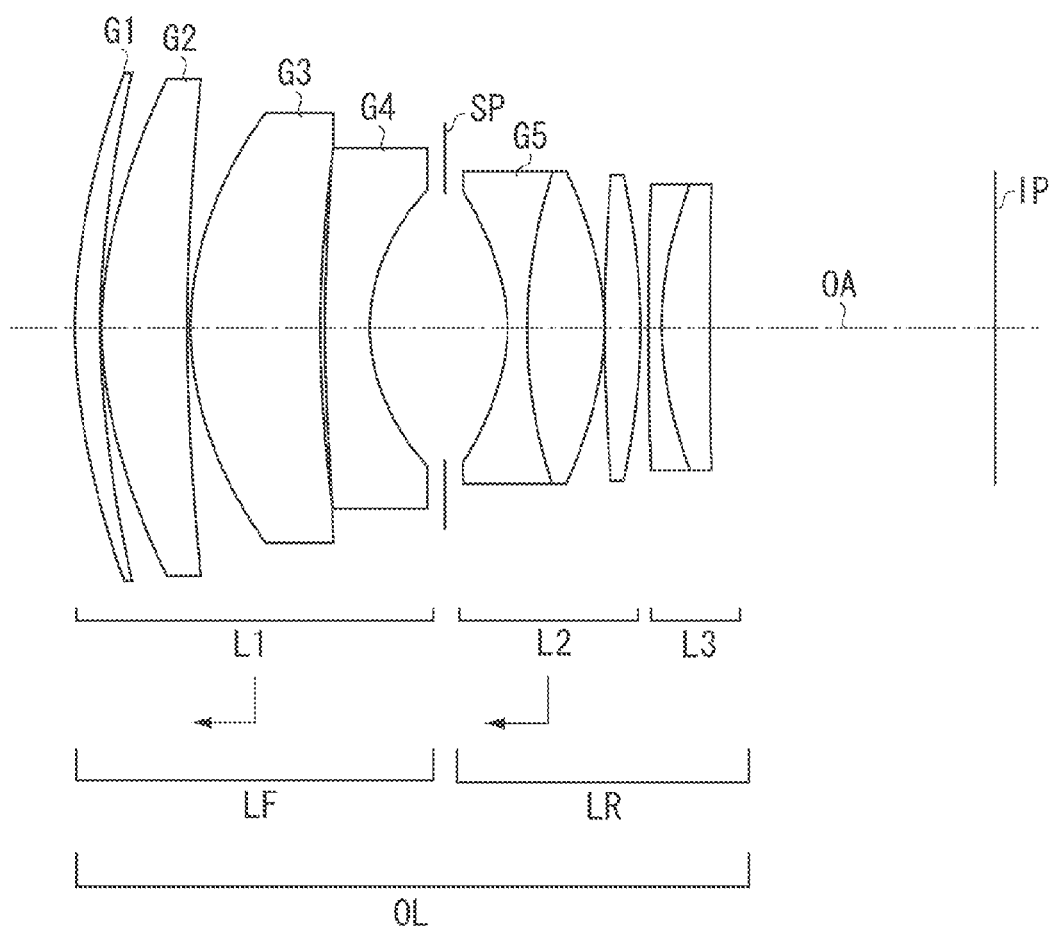
FIG. 1 is a cross section of an optical system according to a first exemplary embodiment of the present invention.

Various exemplary embodiments of the present invention will now be described in detail with reference to the drawings. It should be noted that the relative arrangement of the components, the numerical expressions, and numerical values set forth in these embodiments perform not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

An optical apparatus according to an exemplary embodiment of the present invention includes, in order from the object side to the image side, a first lens unit having a positive refractive power, an aperture stop, and a rear lens group. The rear lens group includes a second lens unit, which moves during focusing. The first lens unit includes n (n is an integer of 2 or greater) positive lenses and one or more negative lenses.

Figure 2:
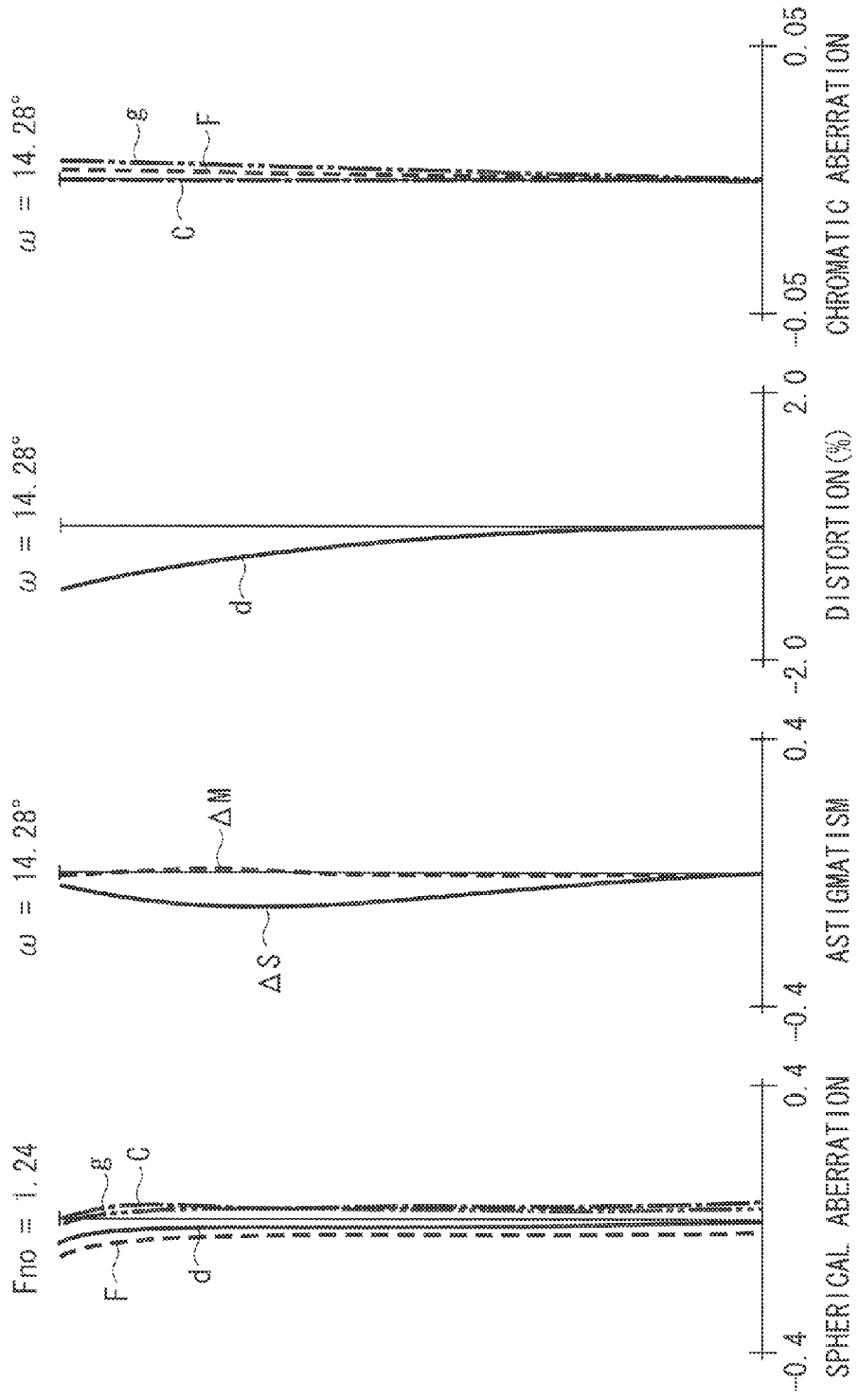
FIG. 2 is a longitudinal aberration chart of the optical system according to the first exemplary embodiment during focusing on an infinitely-distant object.

FIG. 1 is a lens cross section of an optical system according to a first exemplary embodiment of the present invention. FIG. 2 is a various aberration chart of the optical system according to the first exemplary embodiment during focusing on an infinitely-distant object.

Figure 3:
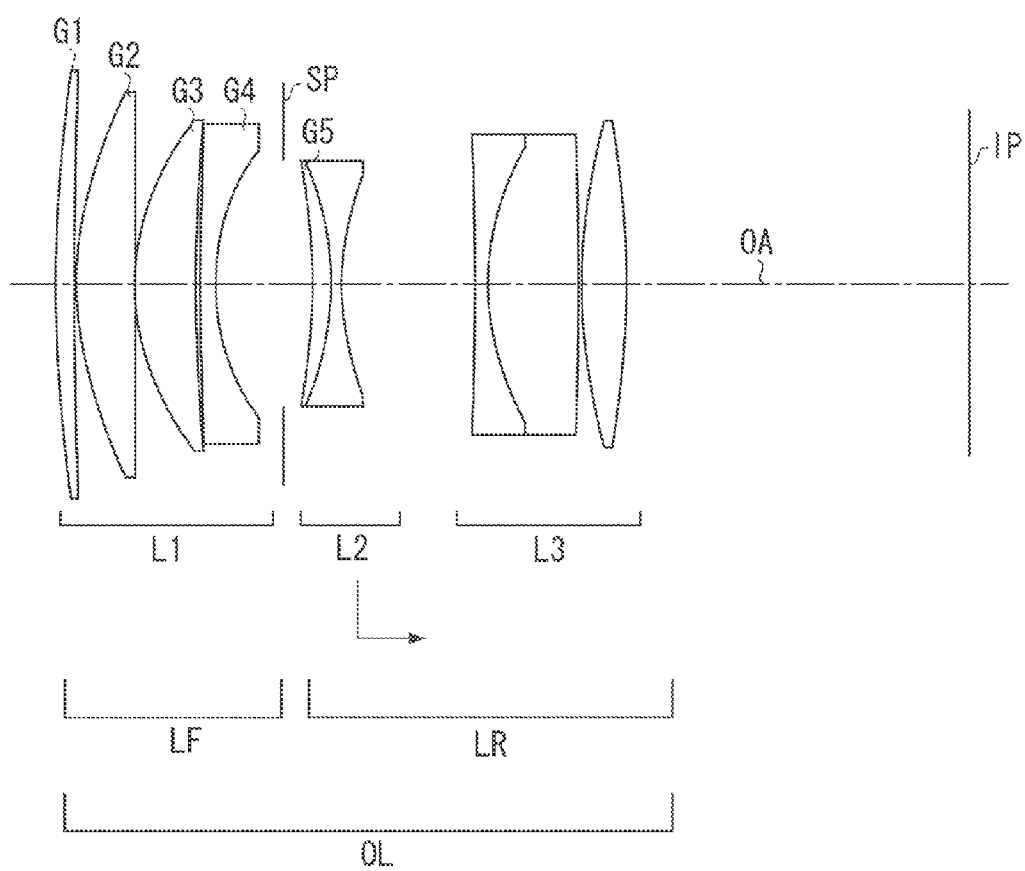
FIG. 3 is a cross section of an optical system according to a second exemplary embodiment of the present invention.
Figure 4:
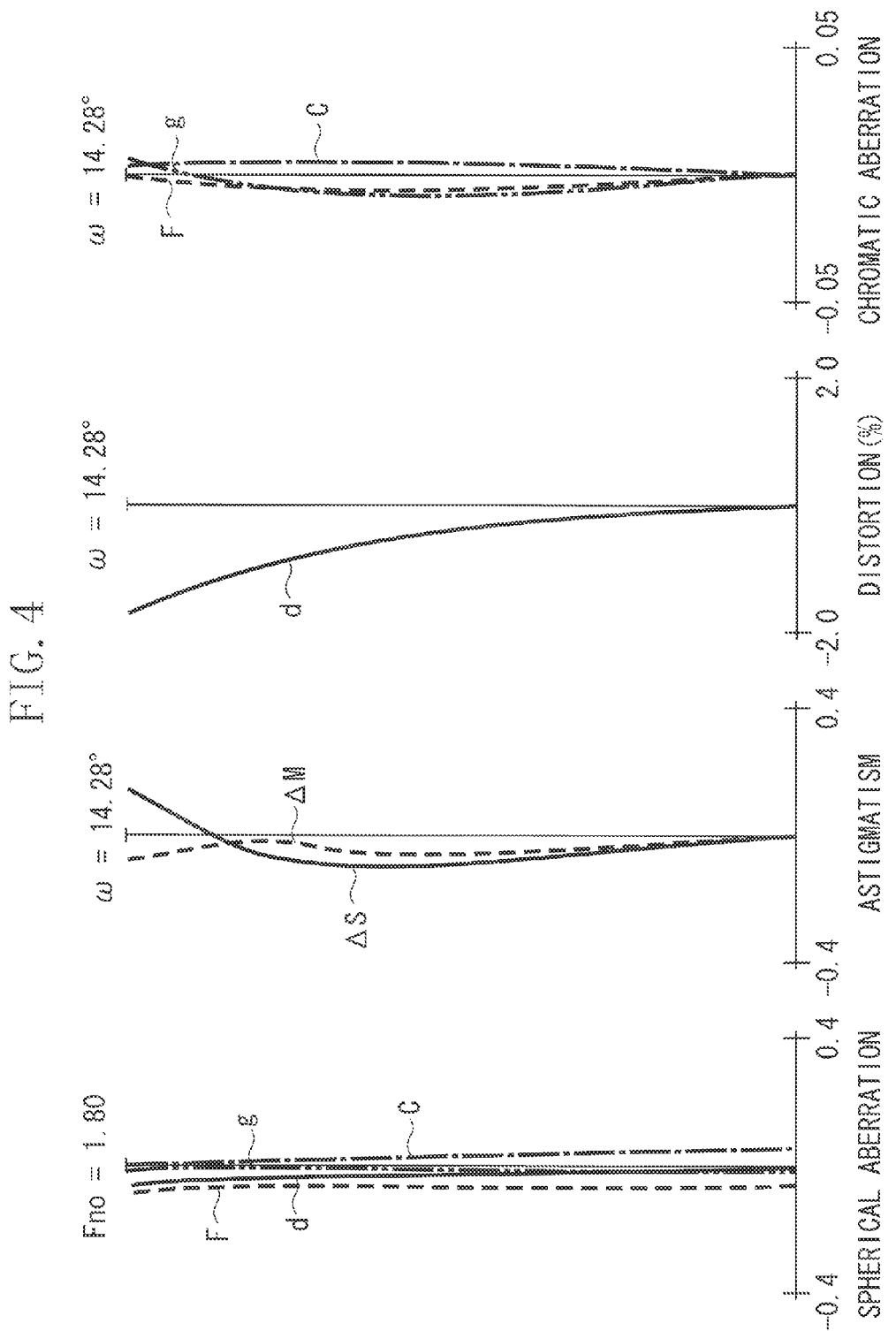
FIG. 4 is a longitudinal aberration chart of the optical system according to the second exemplary embodiment during focusing on an infinitely-distant object.

FIG. 3 is a lens cross section of an optical system according to a second exemplary embodiment of the present invention. FIG. 4 is a various aberration chart of the optical system according to the second exemplary embodiment during focusing on an infinitely-distant object.

Figure 5:
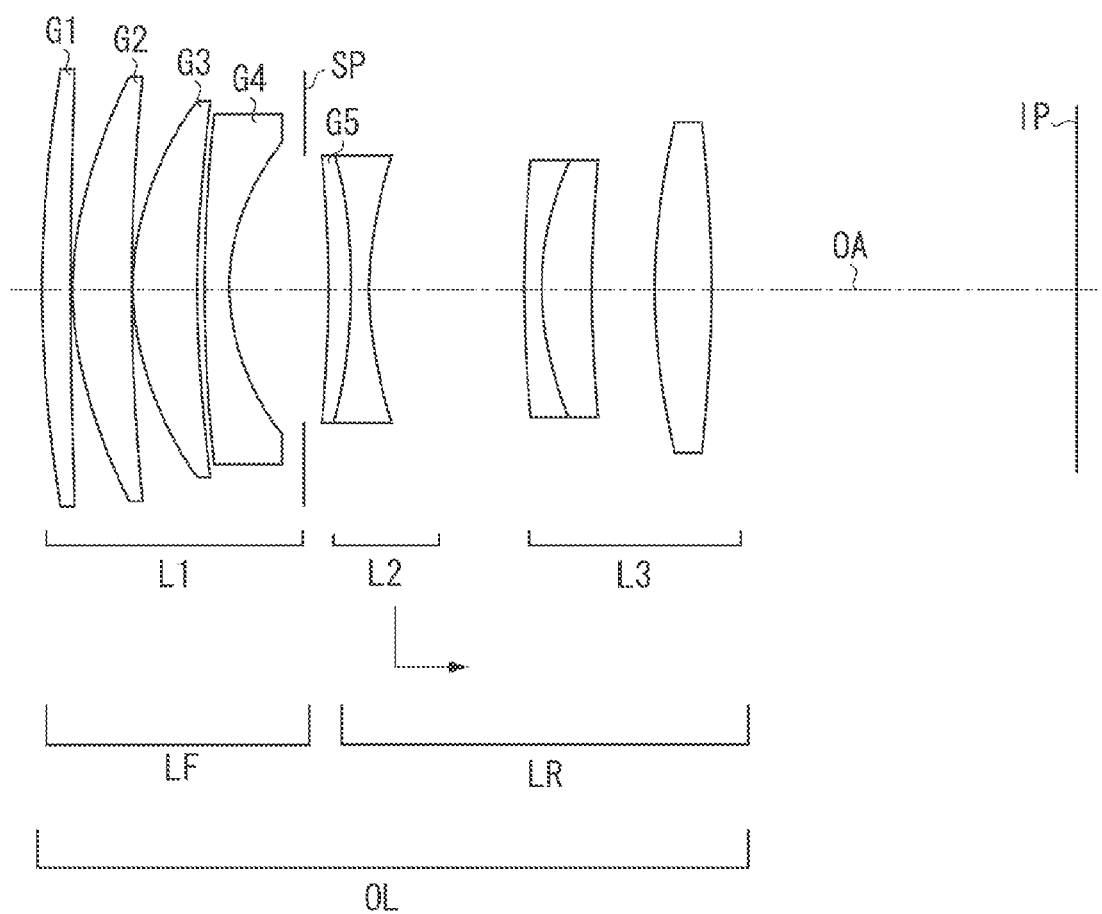
FIG. 5 is a cross section of an optical system according to a third exemplary embodiment of the present invention.
Figure 6:
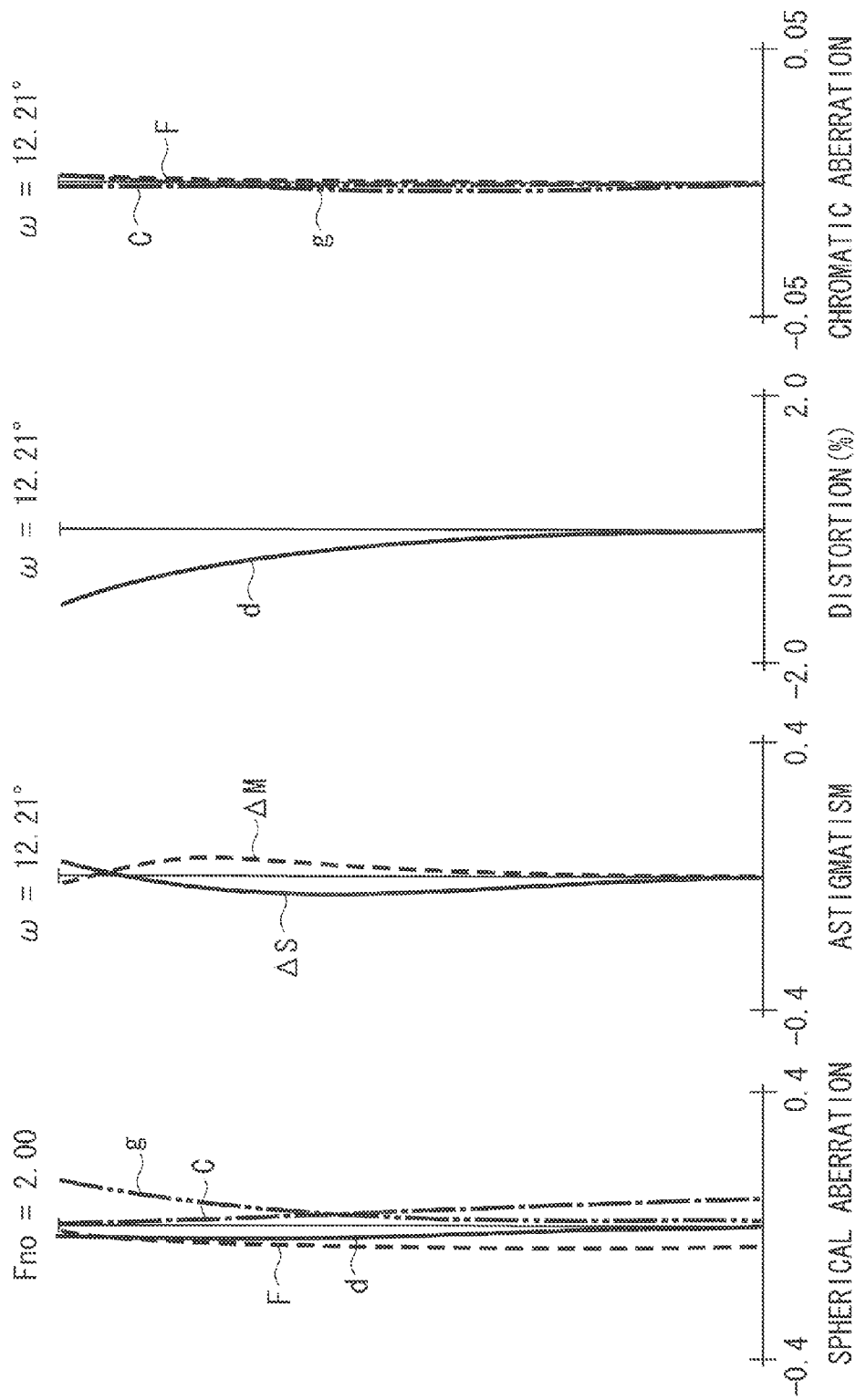
FIG. 6 is a longitudinal aberration chart of the optical system according to the third exemplary embodiment during focusing on an infinitely-distant object.

FIG. 5 is a lens cross section of an optical system according to a third exemplary embodiment of the present invention. FIG. 6 is a various aberration chart of the optical system according to the third exemplary embodiment during focusing on an infinitely-distant object.

Figure 7:
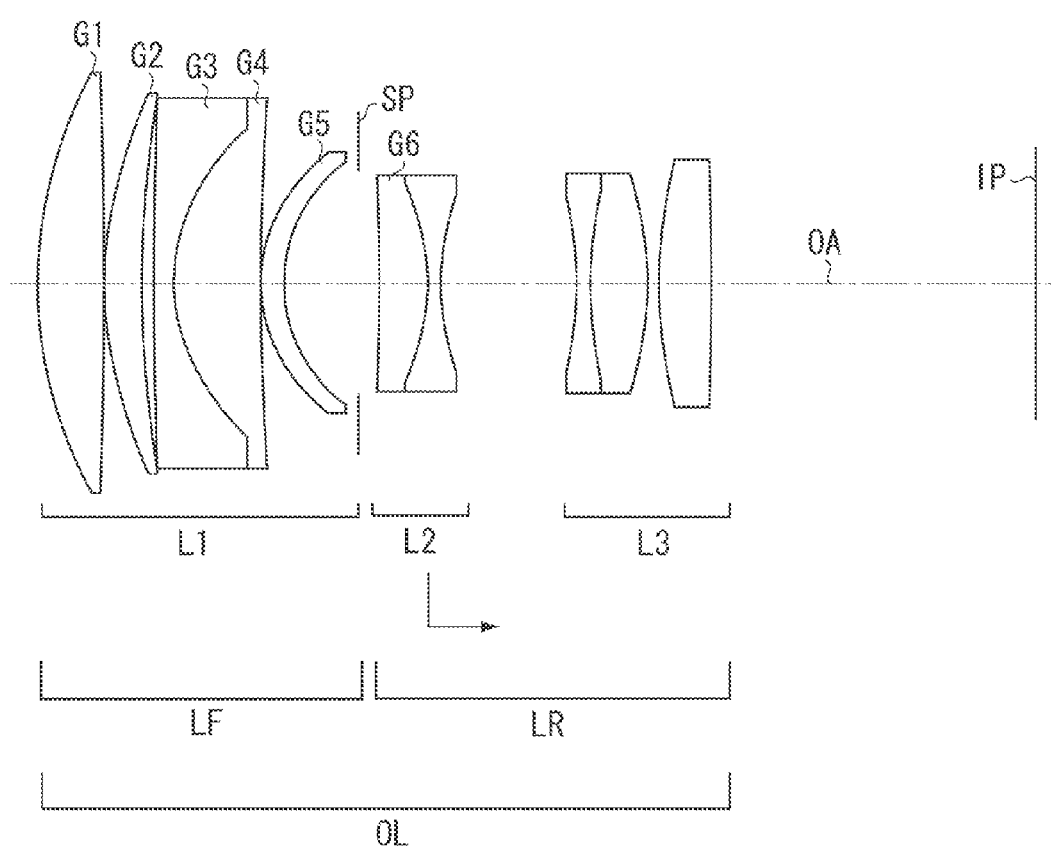
FIG. 7 is a cross section of an optical system according to a fourth exemplary embodiment of the present invention.
Figure 8:
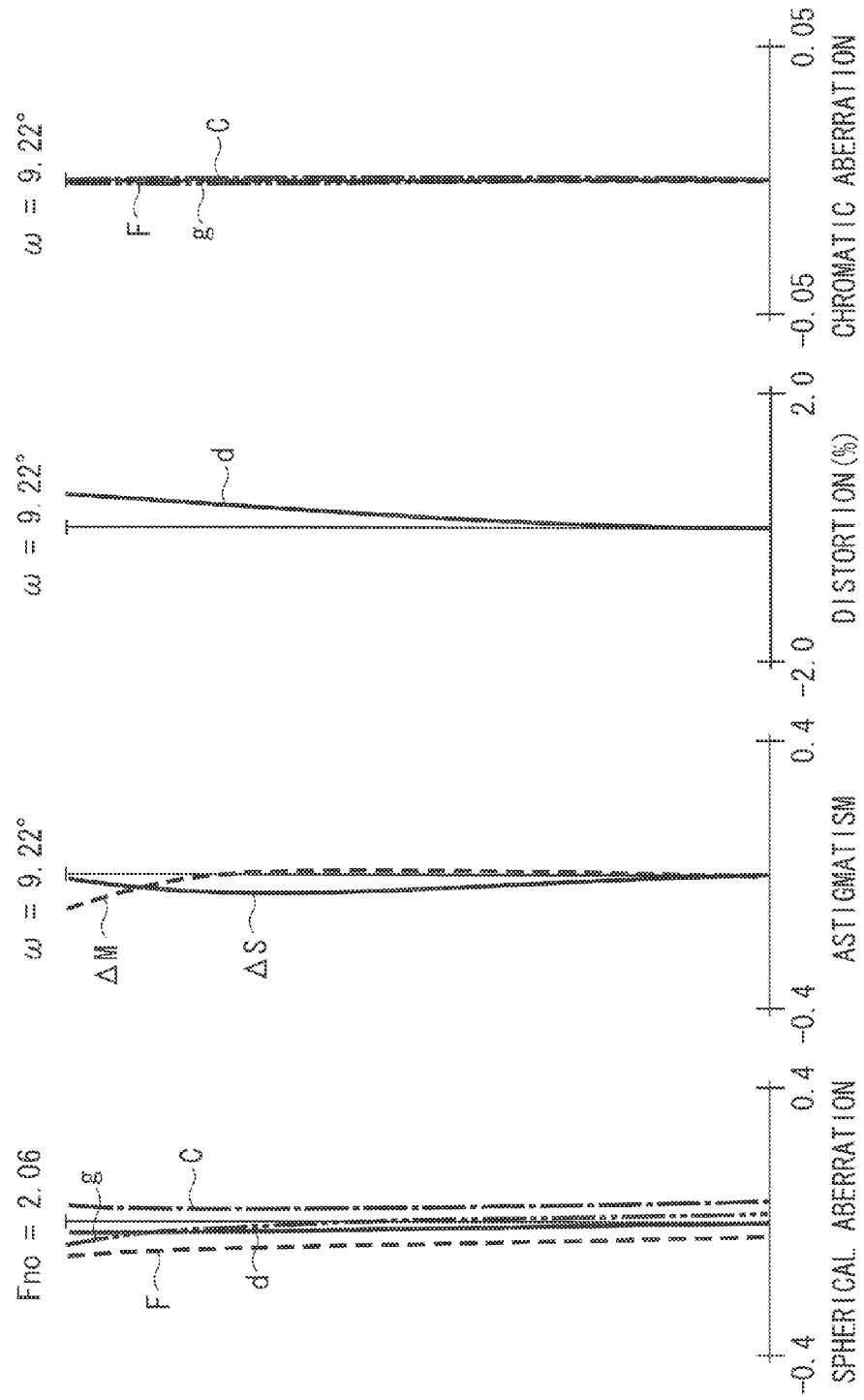
FIG. 8 is a longitudinal aberration chart of the optical system according to the fourth exemplary embodiment during focusing on an infinitely-distant object.

FIG. 7 is a lens cross section of an optical system according to a fourth exemplary embodiment of the present invention. FIG. 8 is a various aberration chart of the optical system according to the fourth exemplary embodiment during focusing on an infinitely-distant object.

Figure 9:
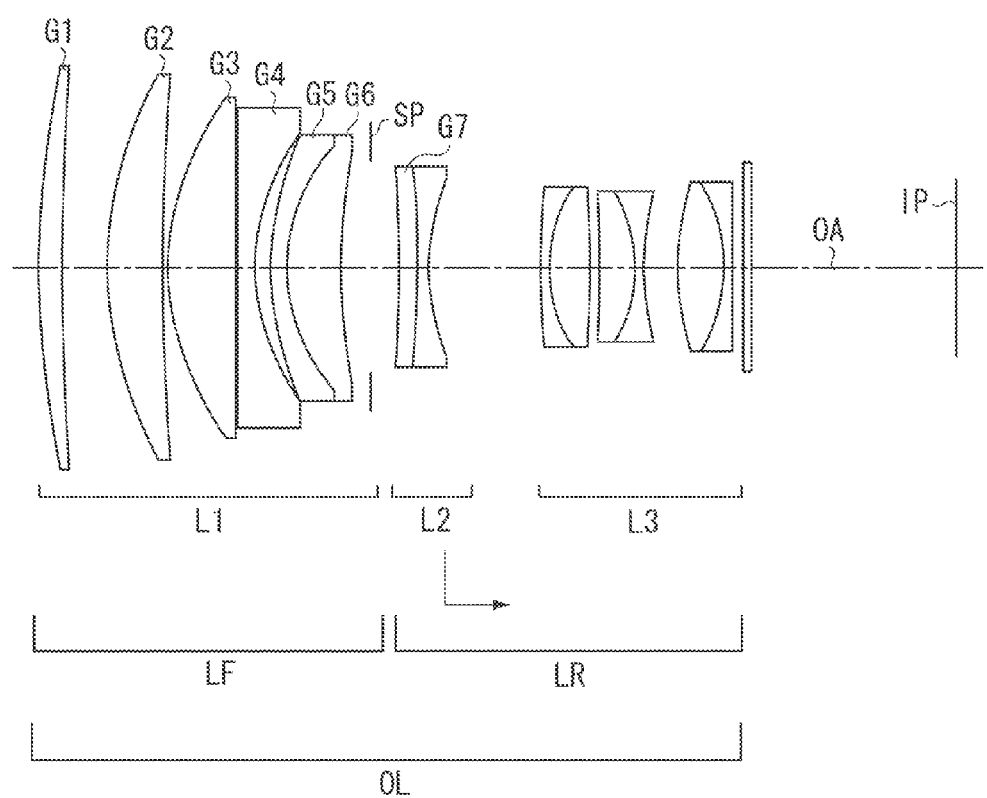
FIG. 9 is a cross section of an optical system according to a fifth exemplary embodiment of the present invention.
Figure 10:
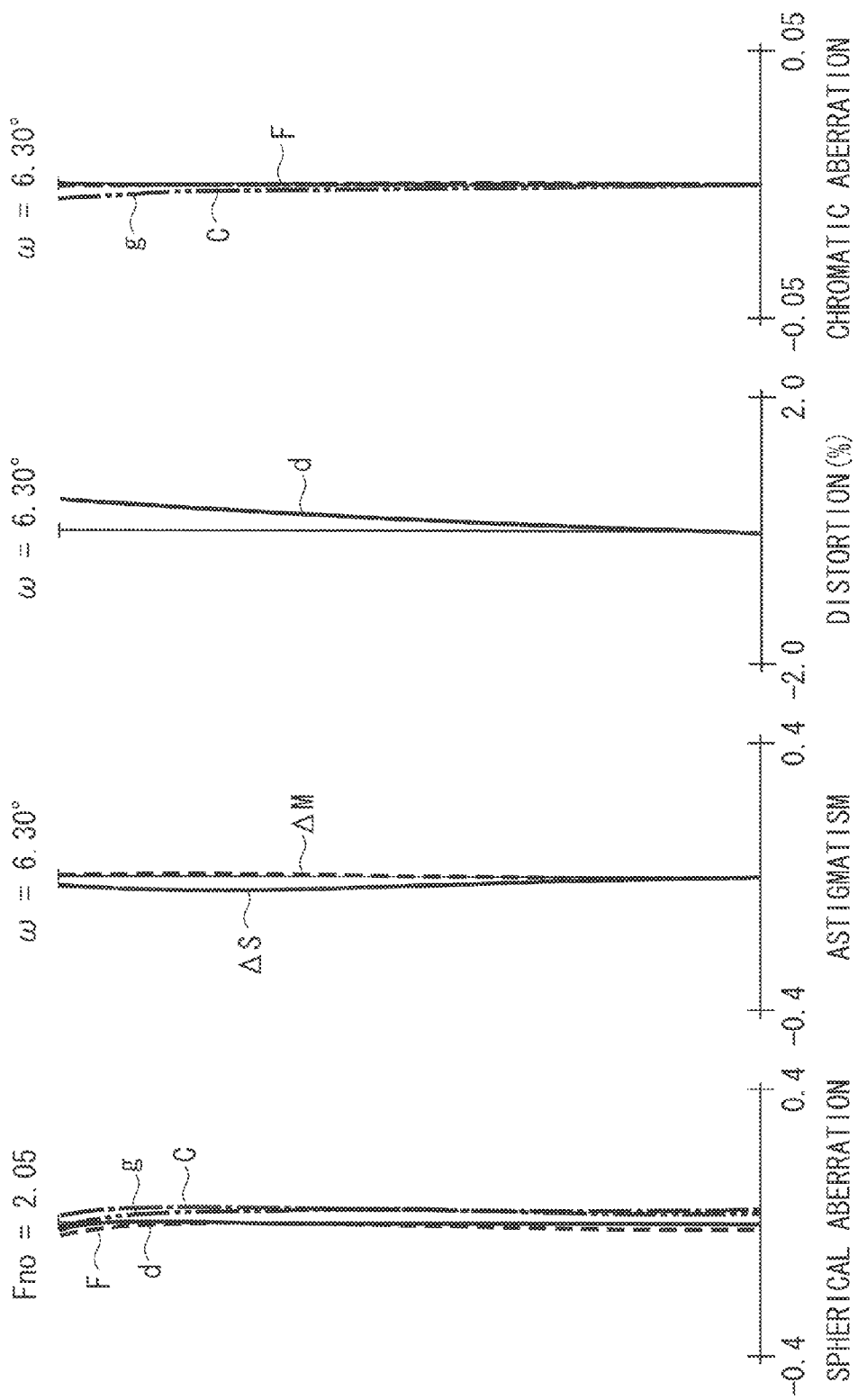
FIG. 10 is a longitudinal aberration chart of the optical system according to the fifth exemplary embodiment during focusing on an infinitely-distant object.

FIG. 9 is a lens cross section of an optical system according to a fifth exemplary embodiment of the present invention. FIG. 10 is a various aberration chart of the optical system according to the fifth exemplary embodiment during focusing on an infinitely-distant object.

Figure 11:
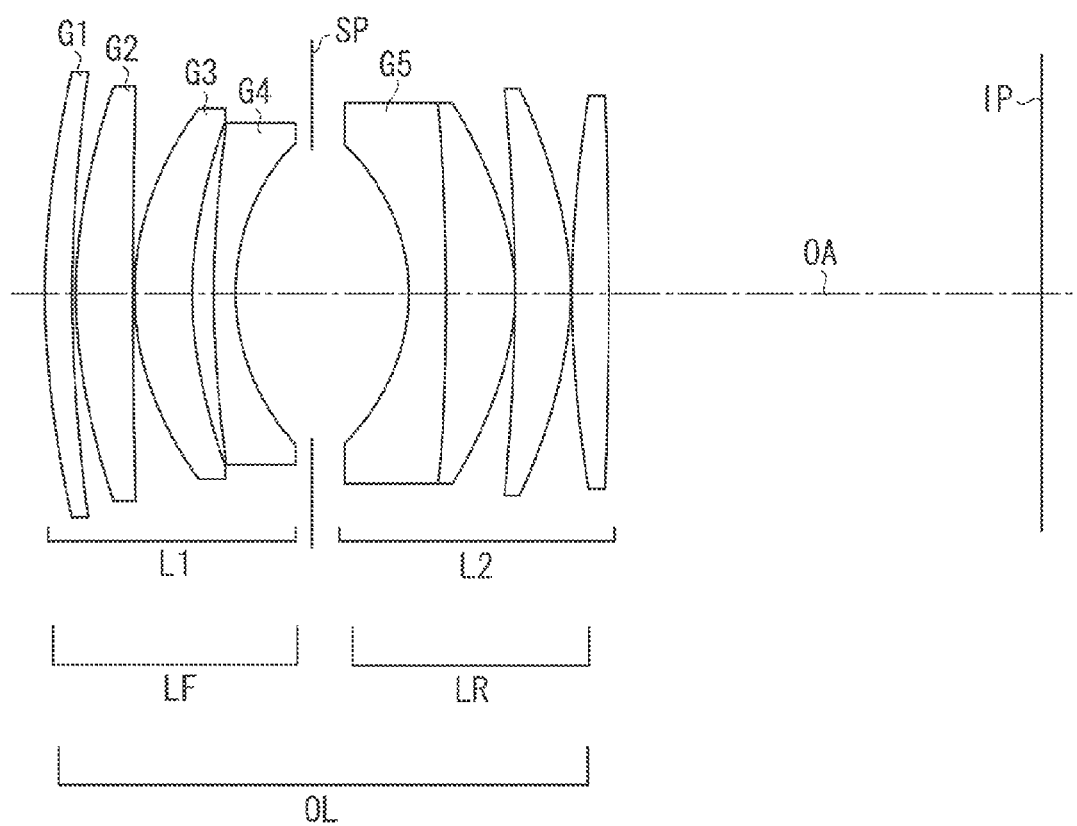
FIG. 11 is a cross section of an optical system according to a sixth exemplary embodiment of the present invention.
Figure 12:
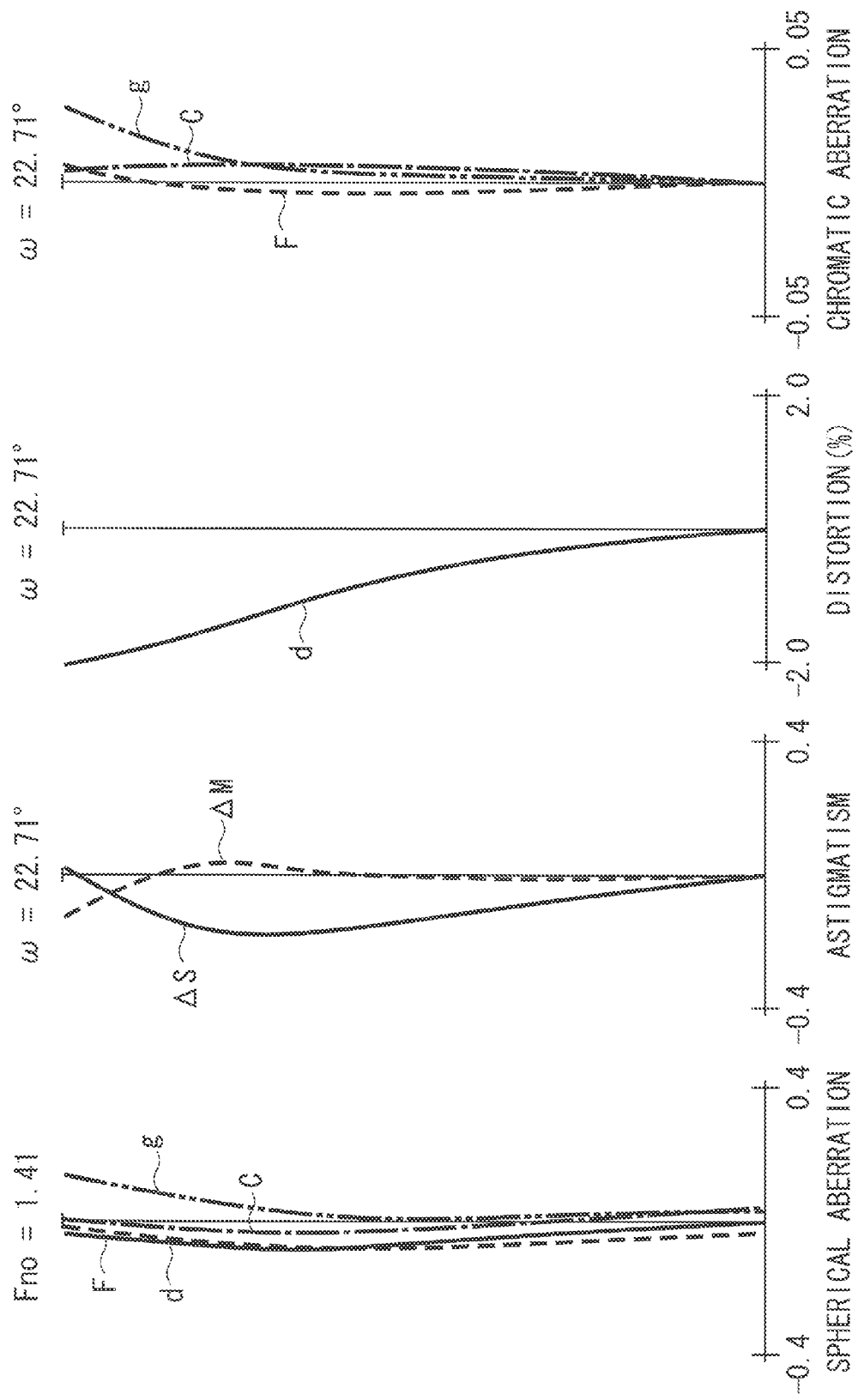
FIG. 12 is a longitudinal aberration chart of the optical system according to the sixth exemplary embodiment during focusing on an infinitely-distant object.
Figure 13:
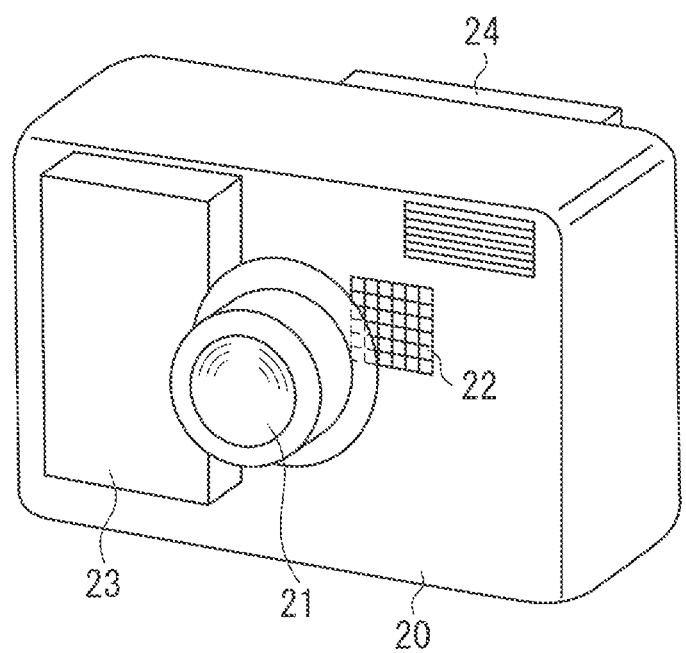
FIG. 13 illustrates main components of an optical apparatus (image pickup apparatus) according to an exemplary embodiment of the present invention.

FIG. 11 is a lens cross section of an optical system according to a sixth exemplary embodiment of the present invention. FIG. 12 is a various aberration chart of the optical system according to the sixth exemplary embodiment during focusing on an infinitely-distant object. FIG. 13 illustrates main components of an optical apparatus (image pickup apparatus) according to an exemplary embodiment of the present invention.

The optical system according to each exemplary embodiment includes a middle focal length lens having a relatively long focal length. In the present invention, the "middle focal length lens" refers to a lens system having an imaging angle of about 12° to 50°.

In each of the diagrams showing a cross section of the middle focal length lens (FIGS. 1, 3, 5, 7, 9, and 11), an object side (front side (enlargement conjugate side)) is illustrated at the left-hand portion of the drawing, and an image side (rear side (reduction conjugate side)) is illustrated at the right-hand portion thereof.

In each of the diagrams showing a cross section of the middle focal length lens (FIGS. 1, 3, 5, 7, 9, and 11), "OL" denotes an optical system. The optical system OL includes, in order from the object side to the image side, a first lens unit L1 having a positive refractive power, an aperture stop SP, and a rear lens group LR having a positive refractive power.

In each of the diagrams showing a cross section of the middle focal length lens (FIGS. 1, 3, 5, 7, 9, and 11), when "j" denotes the order of a lens unit counted from the object side, "Lj" refers to a j-th lens unit (j=1, 2, or 3). In addition, when "k" denotes the order of a lens counted from the object side, "Gk" refers to a k-th lens (k=1, 2, 3, or greater). "SP" denotes the aperture stop.

"IP" denotes an image plane. The image plane IP is, when the optical system according to an exemplary embodiment of the present invention is used as a photographic optical system of a video camera or a digital still camera, equivalent to an imaging plane of a solid-state image sensor (photoelectric conversion element), such as a charge-coupled device (CCD) sensor or a complementary metal-oxide semiconductor (CMOS) sensor. If the optical system according to an exemplary embodiment of the present invention is used as a photographic optical system of a silver-halide film camera, the image plane IP is a photosensitive surface equivalent to a film surface of the optical system of the silver-halide film camera. "OA" denotes an optical axis.

In each aberration chart (FIGS. 2, 4, 6, 8, 10, and 12), "d", "g" "C", and "F" respectively denote d-line, g-line, C-line, and F-line light. "ΔM" and "ΔS" respectively denote a meridional image plane and a sagittal image plane, which are represented with respect to d-line light. Distortion is represented with respect to g-line light. "Fno" denotes an F-number. "ω" denotes a half angle of view.

In each exemplary embodiment, the optical system includes, in order from the object side to the image side, a first lens unit L1 having a positive refractive power, an aperture stop SP, which is provided immediately subsequent to the first lens unit L1 at a location closer to the image side, and a second lens unit L2, which is provided immediately subsequent to the aperture stop SP at a location closer to the image side. The first lens unit L1 includes two or more lenses having a positive refractive power (positive lenses) and one or more lenses having a negative refractive power (negative lenses).

Furthermore, the optical system according to each exemplary embodiment is configured to satisfy at least one of the following conditions. More specifically, with an order of an optical member counted from the object side being indicated by i, a refractive index and an Abbe number of a material of an i-th positive lens of the first lens unit L1 with respect to d-line light (Ndi, vdi (i=1, 2, ... n)), a focal length of the first lens unit L1 (fp), a focal length of the entire optical system (f), maximum and minimum values of the Abbe number vdi (max(vdi), min(vdi)), a minimum value of the refractive index Ndi (min(Ndi)), a radius of curvature of a refractive surface of the first lens unit L1 located closest to the image side, which has a concave shape (Rp), a radius of curvature of a refractive surface of the second lens unit L2 located closest to the object side, which has a concave shape (Rn), a focal length of an air lens formed with refractive surfaces located across the aperture stop SP (fair), a full-aperture F-number of the optical system OL during focusing on an infinitely-distant object (Fno), anomalous partial dispersion of the material of the i-th positive lens of the first lens unit L1 (ΔθgFi (i=1, 2, . . . n)), and a focal length of the i-th positive lens (fi (i=1, 2, . . . n)) satisfy at least one of the following conditions:

$$2.2 < \max(vdi)/\min(vdi) \tag{1}$$

$$\min(vdi) < 30.0 \tag{2}$$

$$1.55 < \min(Ndi) \tag{3}$$

$$0.5 < fp/f < 3.7 \tag{4}$$

$$0.15 < Rp/f < 0.90 \tag{5}$$

$$-15.00 < Rn/f < -0.15 \tag{6}$$

$$-0.900 < \text{fair}/f < -0.175 \tag{7}$$

$$Fno < 2.5 \tag{8}$$

$$3.60 \times 10^{-4} < \Sigma((\Delta\theta gFi/vdi)/fi) \times fp \tag{9}$$

The technical significance of each of the conditions (1) through (9) will be described in detail below. The condition (1) provides a condition for a ratio between the maximum value and the minimum value of the Abbe number vd of the glass material used for the positive lens of the first lens unit L1.

By satisfying the condition (1), the optical system according to each exemplary embodiment can appropriately correct chromatic aberration while maintaining the balance in chromatic aberration, which may occur on different lenses of the entire optical system. The effect of satisfying the condition (1) will be described in more detail below.

In a small-sized optical system (having a high brightness), whose F-number ranges from 1.2 to 2.0, the depth of field is shallow. As a result, if the optical system like this is used, it is necessary to appropriately correct chromatic aberration and various other aberrations, such as spherical aberration, curvature of field, or coma.

In an optical system having a high brightness like this, a glass material having a high refractive index is usually used as a material of the positive lens of the first lens unit L1. Accordingly, various aberrations, such as spherical aberration or curvature of field can be corrected.

Furthermore, in a conventional optical system, a middle dispersion glass material having a high refractive index, which has an Abbe number ranging from 40 to 60 and a refractive index ranging from 1.6 to 1.8, is usually used as the material of a positive lens. Moreover, in a conventional optical system, a high dispersion glass material having a high refractive index, which has an Abbe number ranging from 20 to 30 and a refractive index ranging from 1.6 to 1.8, is usually used as the material of a negative lens. In other words, a conventional optical system corrects various aberrations by using a combination of the above-described positive lens and negative lens.

However, the value of anomalous partial dispersion ΔθgF of a glass material, whose Abbe number vd ranges from 40 to 60 and whose refractive index ranges from 1.6 to 1.8, may often take a negative value. Accordingly, if the glass material like this is used as a material of a positive lens, chromatic aberration may increase. The above-described problem becomes serious in a middle telephoto lens having a high aperture ratio and a relatively long focal length, in which a large amount of chromatic aberration may easily occur.

Considering the correction of chromatic aberration only, a low dispersion glass material having anomalous dispersion, such as fluorite, can be used as a material of the positive lens. However, in this case, it becomes necessary to increase the curvature of the lens surface to achieve a desired refractive power because of the low refractive index. As a result, spherical aberration and curvature of field may increase.

In addition, it becomes necessary to reduce the dispersion of the negative lens, which is used in combination with the positive lens, down to a low dispersion because of the low dispersion of the positive lens. In this case also, in order to satisfy a necessary condition for achromatization, it becomes necessary to increase the curvature of the lens surface of the negative lens. As a result, coma and sagittal flare may increase.

In order to solve the above-described problems, the optical system according to each exemplary embodiment of the present invention includes the first lens unit L1 having two or more positive lenses. In addition, in order to satisfy the above-described condition (1), the optical system according to each exemplary embodiment uses, in combination with each other, a high dispersion glass material as a material of one positive lens and a low dispersion glass material as a material of the other positive lens.

By using the high dispersion glass material and the low dispersion glass material in combination with each other as the material of the positive lenses of the first lens unit L1 as described above, each exemplary embodiment can maintain the balance of chromatic aberration that may occur on the positive lens positive lenses and the negative lens included in the first lens unit L1. In addition, each exemplary embodiment is capable of appropriately correcting coma and sagittal halo without decreasing the dispersion of the material of the negative lens down to the level equivalent to low dispersion and without extremely increasing the curvature of the lens surface.

The value of anomalous partial dispersion $\Delta\theta gF$ of the high dispersion glass material and the relatively low dispersion material is greater than that of a middle dispersion glass material having an Abbe number vd of 40 to 60. As a result, chromatic aberration can also be appropriately corrected.

If the range of the condition (1) is exceeded, then it becomes difficult to appropriately correct various aberrations, such as spherical aberration, curvature of field, or coma while appropriately correcting chromatic aberration for the entire optical system.

The condition (2) provides a condition for the minimum value of the Abbe number vd of the glass material used for the positive lens of the first lens unit L1. By using the high dispersion glass material that satisfies the range of the condition (2) as the material of the positive lens of the first lens unit L1, each exemplary embodiment can appropriately correct chromatic aberration. If the range of the condition (2) is exceeded, then it becomes difficult to correct chromatic aberration.

The condition (3) provides a condition for the minimum value of the refractive index Ndi of the glass material used for the positive lens of the first lens unit L1. By using a glass material that satisfies the condition (3) as the material of the positive lens, each exemplary embodiment can appropriately correct various aberrations, such as spherical aberration, curvature of field, or coma.

If the range of the condition (3) is exceeded, then it becomes difficult to appropriately correct various aberrations.

The condition (4) provides a condition for the ratio of the focal length of the first lens unit L1 to the focal length of the entire optical system.

By satisfying the condition (4), each exemplary embodiment can suppress the level of various aberrations, such as spherical aberration, curvature of field, or coma, to an appropriately low level while preventing a large optical system. If the lower limit value of the condition (4) is exceeded, then refractive power of the first lens unit L1 becomes relatively intense. As a result, it becomes difficult to appropriately correct various aberrations, such as spherical aberration, curvature of field, or coma. On the other hand, if the upper limit value of the condition (4) is exceeded, then the refractive power of the first lens unit L1 becomes small. As a result, the optical system may become relatively large.

In the optical system according to each exemplary embodiment, the refractive surface of the first lens unit L1 closest to the image side has a concave shape facing the image side. The refractive surface of the second lens unit L2 closest to the object side has a concave shape facing the object side.

The condition (5) provides a condition for the radius of curvature of the refractive surface of the first lens unit L1 closest to the image side. The condition (6) provides a condition for the radius of curvature of the refractive surface of the second lens unit L2 closest to the object side. The refractive surfaces, which have a convex shape, are provided across the aperture stop SP. With the convex surfaces, each exemplary embodiment can appropriately correct various aberrations, such as curvature of field, coma, or sagittal halo. If the range of each of the conditions (5) and (6) is exceeded, then various aberrations, such as coma and sagittal halo may increase.

It is necessary that the curvature of the refractive surface of the first lens unit L1 closest to the image side is sufficiently high as expressed by the condition (5). On the contrary, the refractive surface of the second lens unit L2 closest to the object side can have a relatively low curvature and can take an almost flat shape.

The condition (7) provides a condition for the ratio of the focal length of an air lens constituted by the refractive surface of the first lens unit L1 closest to the image side and the refractive surface of the second lens unit L2 closest to the object side, which are provided across the aperture stop SP to the focal length of the entire optical system. By utilizing the air lens having the refractive power of a value within the range expressed by the condition (7), each exemplary embodiment can appropriately correct various aberrations, such as coma or sagittal halo. If the range of the condition (7) is exceeded, then various aberrations, such as coma or sagittal halo, may increase.

The condition (8) provides a condition for the aperture ratio (F-number) of the optical system. By satisfying the condition (8), each exemplary embodiment can achieve an optical system having a high brightness.

The anomalous partial dispersion $\Delta\theta gF$ will be described in detail below.

Take "Ng" as a refractive index of the material with respect to g-line light (wavelength: 435.8 nm), "NF" as a refractive index of the material with respect to F-line light (wavelength: 486.1 nm), "Nd" as a refractive index of the material with respect to d-line light (wavelength: 587.6 nm), and "NC" as a refractive index of the material with respect to C-line light (wavelength: 656.3 nm). Then, the Abbe number vd, the relative partial dispersion $\theta gF$, and the anomalous partial dispersion $\Delta\theta gF$ can be expressed as follows:

$$vd = (Nd-1)/(NF-NC) \quad (a)$$

$$\theta gF = (Ng-NF)/(NF-NC) \quad (b)$$

$$\Delta\theta gF = \theta gF - (-1.665 \times 10^{-7} \times vd^3 + 5.213 \times 10^{-5} \times vd^2 - 5.656 \times 10^{-3} \times vd + 7.278 \times 10^{-1}) \quad (c)$$

The amount of chromatic aberration occurring in the lens provided to the optical system is inversely proportional to the Abbe number vd and proportional to the refractive power 1/f (=ϕ). This is an amount of chromatic aberration with respect to F-line through C-line light, which is expressed by the Abbe number vd.

For a shooting lens, it is usually necessary to consider the g-line light, which has a wavelength shorter than the wavelength of F-line light. In other words, it is necessary to balance the chromatic aberration in the wide range of wavelengths from g-line light to C-line light. Accordingly, the amount of chromatic aberration occurring in the entire optical system may increase unless chromatic aberration in the short wavelength is appropriately corrected.

The amount of chromatic aberration occurring with respect to g-line light through F-line light is inversely proportional to the Abbe number vd and proportional to the relative partial dispersion θgF and the refractive power 1/f (=ϕ). In addition, the intensity of the effect of correcting chromatic aberration in the short wavelength is inversely proportional to the Abbe number vd, is proportional to the anomalous partial dispersion ΔθgF and the refractive power 1/f (=ϕ), and can be expressed by the following expression:

$$\Delta\theta gF/vd/f \quad (d).$$

In the lens provided in the optical system, the greater the absolute value of the result of the above-described expression (d) becomes, the higher the effect of correcting chromatic aberration becomes.

The condition (9) is defined based on the above-described findings. More specifically, the condition (9) defines the total sum of the effects of correcting chromatic aberration on the positive lens included in the first lens unit L1. In the condition (9), in order to express the effect of achromatization in the first lens unit, the focal length of each lens is defined by division by the focal length of the first lens unit.

By satisfying the condition (9), each exemplary embodiment can appropriately correct chromatic aberration only by the positive lens of the first lens unit L1. As a result, each exemplary embodiment can reduce the amount of chromatic aberration occurring in the entire optical system. If the range of the condition (9) is exceeded, then chromatic aberration cannot be sufficiently corrected. As a result, chromatic aberration occurring in the entire optical system cannot be sufficiently corrected.

If the optical system according to each exemplary embodiment is used in an optical apparatus including a photoelectric conversion element, a half angle of view regulated by an effective imaging plane of the photoelectric conversion element (ω) satisfies the following condition:

$$6° < \omega < 25° \quad (10).$$

The condition (10) provides a condition for the half angle of view when the optical system is applied to an optical apparatus. By satisfying the condition (10), each exemplary embodiment can appropriately correct various aberrations, such as chromatic aberration.

With the above-described configuration, each exemplary embodiment of the present invention can achieve an optical system having a high aperture ratio, which is capable of appropriately correcting various aberrations, such as spherical aberration or curvature of field.

In order to effectively correct aberration, it is yet further useful if the ranges of the values in the conditions (1) through (10) are altered as follows:

$$2.25 < \max(vdi)/\min(vdi) < 4.00 \quad (1a)$$

$$\min(vdi) < 29.9 \quad (2a)$$

$$1.552 < \min(Ndi) \quad (3a)$$

$$0.6 < fp/f < 3.6 \quad (4a)$$

$$0.16 < Rp/f < 0.80 \quad (5a)$$

$$-14.00 < Rn/f < -0.20 \quad (6a)$$

$$-0.895 < fair/f < -0.177 \quad (7a)$$

$$1.15 < Fno < 2.30 \quad (8a)$$

$$3.80 \times 10-4 < \Sigma((\Delta\theta gFi/vdi)/fi) \times fp \quad (9a)$$

$$6.2° < \omega < 24.0° \quad (10a).$$

Now, an exemplary configuration of each exemplary embodiment will be described in detail below. To begin with, the optical system OL according to the first exemplary embodiment will be described in detail below with reference to FIG. 1.

The optical system OL according to the first exemplary embodiment is a middle focal length lens having a high aperture ratio. Referring to FIG. 1, the optical system OL according to the first exemplary embodiment includes, in order from the object side to the image side, a front lens group LF having a positive refractive power, an aperture stop SP, and a rear lens group LR having a positive refractive power.

The front lens group LF includes the first lens unit L1 having a positive refractive power. The rear lens group LR includes the second lens unit L2 having a positive refractive power and the third lens unit L3 having a positive refractive power.

Focusing from an infinitely-distant object to a short-distance object is executed by moving the first lens unit L1, the aperture stop SP, and the second lens unit L2 towards the object side, as shown by the solid arrows extending from L1 and L2 in FIG. 1. During focusing, the third lens unit L3 is stationary.

The first lens unit L1 includes three positive lenses G1 through G3 and one negative lens G4. The focal length of the first lens unit L1 is 234.92. This is a value of the following numerical example expressed in the unit of millimeter (mm). This applies to all the following values. The focal length of the entire optical system is 85.00 mm. The aperture ratio (Fno) is 1.24. The half angle of view ω is 14.28°.

The focal lengths of the positive lenses G1, G2 and G3 included in the first lens unit L1 are 303.78, 149.72, and 102.56, respectively. A surface R1 (the surface on the object side) of the positive lens G3 has an aspheric shape. S-TIH53 (a product of OHARA INC.) is used as the glass material of the positive lens G1. In the positive lens G1, the refractive index Nd, which is determined with respect to d-line light, is 1.847; the Abbe number vd is 23.9. The relative partial dispersion θgF is 0.620. The anomalous partial dispersion ΔθgF is −0.0003.

K-GFK70 (a product of SUMITA OPTICAL GLASS, Inc.) is used as the glass material of the positive lenses G2 and G3. In the glass material of the positive lenses G2 and G3, the refractive index Nd with respect to d-line light is 1.569; the Abbe number vd is 71.3; and the relative partial dispersion (θgF) is 0.545. The anomalous partial dispersion ΔθgF is 0.0159.

According to the first exemplary embodiment, the radius of curvature Rp of the refractive surface on the image side of the negative lens G4, which is provided closest to the image side among the lenses of the first lens unit L1, is 27.08. The radius of curvature Rn of the refractive surface on the object side of the negative lens G5, which is provided closest to the object side among the lenses of the second lens unit L2, is −31.71.

In the first exemplary embodiment, the ratio of the Abbe number vd corresponding to the condition (1) is 2.98. The minimum Abbe number and the minimum refractive index corresponding to the conditions (2) and (3) are 23.9 and 1.569, respectively. The value corresponding to the condition (4), which is a value calculated by dividing the focal length of the first lens unit L1 by the focal length of the entire optical system, is 2.76.

Furthermore, in the first exemplary embodiment, values corresponding to the conditions (5) and (6) are 0.32 and −0.37, respectively. The value corresponding to the condition (7), which is a value calculated by dividing the focal length of the air lens by the focal length of the entire optical system, is −0.18. In addition, the F-number Fno corresponding to the condition (8) is 1.24. The amount corresponding to the condition (9), which defines the chromatic aberration correction condition, is $8.54 \times 10^{-4}$. Furthermore, the half angle of view ω corresponding to the condition (10) is 14.28°.

In the first exemplary embodiment, the first lens unit L1 includes the positive lens made of a low dispersion glass material and the positive lens made of a high dispersion glass material to appropriately correct chromatic aberration. Accordingly, the first exemplary embodiment having the above-described configuration, in particular, a high aperture ratio of 1.24, can appropriately correct chromatic aberration, which is conspicuous in a middle focal length lens having a high aperture ratio as can be appreciated from the longitudinal aberration chart of FIG. 2. Furthermore, the first exemplary embodiment can appropriately correct various aberrations, such as spherical aberration and curvature of field.

The optical system OL according to the second exemplary embodiment will be described in detail below with reference to FIG. 3. Referring to FIG. 3, the optical system OL according to the second exemplary embodiment is a middle focal length lens having a high aperture ratio.

In the example illustrated in FIG. 3, the optical system OL includes, in order from the object side to the image side, the front lens group LF having a positive refractive power, the aperture stop SP, and the rear lens group LR having a positive refractive power.

The front lens group LF includes the first lens unit L1 having a positive refractive power. The rear lens group LR includes the second lens unit L2 having a negative refractive power and the third lens unit L3 having a positive refractive power. Focusing from an infinitely-distant object to a short-distance object is executed by moving the second lens unit L2 towards the image side, as shown by the arrow extending from L2.

The first lens unit L1 includes three positive lenses G1 through G3 and one negative lens G4. The focal length of the first lens unit L1 is 83.82. The focal length of the entire optical system is 85.00 mm. The aperture ratio (Fno) is 1.80. The half angle of view ω is 14.28°.

In the first lens unit L1, the focal lengths of the positive lenses G1 through G3 are 249.19, 87.43, and 64.88, respectively. S-TIH53 (a product of OHARA INC.) is used as the glass material of the positive lens G1. The refractive index Nd with respect to d-line light is 1.847. The Abbe number vd is 23.9.

The relative partial dispersion θgF is 0.620. The anomalous partial dispersion ΔθgF is −0.0003. K-GFK70 (a product of SUMITA OPTICAL GLASS, Inc.) is used as the glass material of the positive lenses G2 and G3. The refractive index Nd with respect to d-line light is 1.569. The Abbe number vd is 71.3. The relative partial dispersion θgF is 0.545. The anomalous partial dispersion ΔθgF is 0.0159.

According to the second exemplary embodiment, the radius of curvature Rp of the refractive surface on the image side of the negative lens G4, which is provided closest to the image side among the lenses of the first lens unit L1, is 27.05. The radius of curvature Rn of the refractive surface on the object side of the negative lens G5, which is provided closest to the object side among the lenses of the second lens unit L2, is −72.48.

In the second exemplary embodiment, the ratio of the Abbe number vd corresponding to the condition (1) is 2.98. The minimum Abbe number and the minimum refractive index corresponding to the conditions (2) and (3) are 23.9 and 1.569, respectively. The value corresponding to the condition (4), which is a value calculated by dividing the focal length of the first lens unit L1 by the focal length of the entire optical system, is 0.99.

Furthermore, in the second exemplary embodiment, values corresponding to the conditions (5) and (6) are 0.32 and −0.85, respectively. The value corresponding to the condition (7), which is a value calculated by dividing the focal length of the air lens by the focal length of the entire optical system, is −0.28. In addition, the F-number Fno corresponding to the condition (8) is 1.80. The amount corresponding to the condition (9), which defines the chromatic aberration correction condition, is $4.99 \times 10^{-4}$. Furthermore, the half angle of view ω corresponding to the condition (10) is 14.28°.

In the second exemplary embodiment, the first lens unit L1 includes the positive lens made of a low dispersion glass material and the positive lens made of a high dispersion glass material to appropriately correct chromatic aberration. Accordingly, the second exemplary embodiment having the above-described configuration, in particular, a high aperture ratio of 1.80, can appropriately correct chromatic aberration, which is conspicuous in a middle focal length lens having a high aperture ratio as can be determined from the longitudinal aberration chart of FIG. 4. Furthermore, the second exemplary embodiment can appropriately correct various aberrations, such as spherical aberration and curvature of field.

The optical system OL according to the third exemplary embodiment will be described in detail below with reference to FIG. 5. Referring to FIG. 5, the optical system OL according to the third exemplary embodiment is a middle focal length lens having a high aperture ratio.

In the example illustrated in FIG. 5, the optical system OL includes, in order from the object side to the image side, the front lens group LF having a positive refractive power, the aperture stop SP, and the rear lens group LR.

The front lens group LF includes the first lens unit L1 having a positive refractive power. The rear lens group LR includes the second lens unit L2 having a negative refractive power and the third lens unit L3 having a positive refractive power. Focusing from an infinitely-distant object to a short-distance object is executed by moving the second lens unit L2 towards the image side.

The first lens unit L1 includes three positive lenses G1 through G3 and one negative lens G4. The focal length of the first lens unit L1 is 93.92. The focal length of the entire optical system is 100.00 mm. The aperture ratio (Fno) is 2.00. The half angle of view ω is 12.21°.

In the first lens unit L1, the focal lengths of the positive lenses G1 through G3 are 200.00, 99.12, and 75.15, respectively. S-TIH53 (a product of OHARA INC.) is used as the glass material of the positive lens G1. The refractive index Nd with respect to d-line light is 1.847. The Abbe number vd is 23.9.

The relative partial dispersion θgF is 0.620. The anomalous partial dispersion ΔθgF is −0.0003. FCD505 (a product of HOYA CORPORATION) is used as the glass material of the positive lenses G2 and G3. The refractive index Nd with respect to d-line light is 1.593. The Abbe number vd is 68.6. The relative partial dispersion θgF is 0.545. The anomalous partial dispersion ΔθgF is 0.0132.

According to the third exemplary embodiment, the radius of curvature Rp of the refractive surface on the image side of the negative lens G4, which is provided closest to the image side among the lenses of the first lens unit L1, is 26.97. The radius of curvature Rn of the refractive surface on the object side of the negative lens G5, which is provided closest to the object side among the lenses of the second lens unit L2, is −127.15.

In the third exemplary embodiment, the ratio of the Abbe number vd corresponding to the condition (1) is 2.87. The minimum Abbe number and the minimum refractive index corresponding to the conditions (2) and (3) are 23.9 and 1.593, respectively. The value corresponding to the condition (4), which is a value calculated by dividing the focal length of the first lens unit L1 by the focal length of the entire optical system, is 0.94.

Furthermore, in the third exemplary embodiment, values corresponding to the conditions (5) and (6) are 0.27 and −1.27, respectively. The value corresponding to the condition (7), which is a value calculated by dividing the focal length of the air lens by the focal length of the entire optical system, is −0.27. In addition, the F-number Fno corresponding to the condition (8) is 2.00. The amount corresponding to the condition (9), which defines the chromatic aberration correction condition, is $4.19 \times 10^{-4}$. Furthermore, the half angle of view ω corresponding to the condition (10) is 12.21°.

In the third exemplary embodiment, the first lens unit L1 includes the positive lens made of a low dispersion glass material and the positive lens made of a high dispersion glass material to appropriately correct chromatic aberration. Accordingly, the third exemplary embodiment having the above-described configuration, in particular, a high aperture ratio of 2.00, can appropriately correct chromatic aberration, which is conspicuous in a middle focal length lens having a high aperture ratio as can be surmised from the longitudinal aberration chart of FIG. 6. Furthermore, the third exemplary embodiment can appropriately correct various aberrations, such as spherical aberration and curvature of field.

The optical system OL according to the fourth exemplary embodiment will be described in detail below with reference to FIG. 7. Referring to FIG. 7, the optical system OL according to the fourth exemplary embodiment is a middle focal length lens having a high aperture ratio.

In the example illustrated in FIG. 7, the optical system OL includes, in order from the object side to the image side, the front lens group LF having a positive refractive power, the aperture stop SP, and the rear lens group LR having a positive refractive power.

The front lens group LF includes the first lens unit L1 having a positive refractive power. The rear lens group LR includes the second lens unit L2 having a negative refractive power and the third lens unit L3 having a positive refractive power. Focusing from an infinitely-distant object to a short-distance object is executed by moving the second lens unit L2 towards the image side.

The first lens unit L1 includes three positive lenses G1, G2, and G4 and two negative lenses G3 and G5. The focal length of the first lens unit L1 is 96.92. The focal length of the entire optical system is 133.30 mm. The aperture ratio (Fno) is 2.06. The half angle of view ω is 9.22°.

In the first lens unit L1, the focal lengths of the positive lenses G1, G2, and G4 are 110.84, 130.04, and 64.80, respectively. FCD505 (a product of HOYA CORPORATION) is used as the glass material of the positive lens G1. The refractive index Nd with respect to d-line light is 1.593. The Abbe number vd is 68.6.

The relative partial dispersion θgF is 0.545. The anomalous partial dispersion ΔθgF is 0.0132. S-TIH53 (a product of OHARA INC.) is used as the glass material of the positive lens G2. The refractive index Nd with respect to d-line light is 1.847. The Abbe number vd is 23.9. The relative partial dispersion θgF is 0.620. The anomalous partial dispersion ΔθgF is −0.0003.

M-FCD500 (a product of HOYA CORPORATION) is used as the glass material of the negative lens G3. The refractive index Nd with respect to d-line light is 1.553. The Abbe number vd is 71.7. The relative partial dispersion θgF is 0.540. The anomalous partial dispersion ΔθgF is 0.0113.

According to the fourth exemplary embodiment, the radius of curvature Rp of the refractive surface on the image side of the negative lens G5, which is provided closest to the image side among the lenses of the first lens unit L1, is 23.84. The radius of curvature Rn of the refractive surface on the object side of the negative lens G6, which is provided closest to the object side among the lenses of the second lens unit L2, is −387.78.

In the fourth exemplary embodiment, the ratio of the Abbe number vd corresponding to the condition (1) is 3.00. The minimum Abbe number and the minimum refractive index corresponding to the conditions (2) and (3) are 23.9 and 1.553, respectively. The value corresponding to the condition (4), which is a value calculated by dividing the focal length of the first lens unit L1 by the focal length of the entire optical system, is 0.72.

Furthermore, in the fourth exemplary embodiment, values corresponding to the conditions (5) and (6) are 0.18 and −2.91, respectively. The value corresponding to the condition (7), which is a value calculated by dividing the focal length of the air lens by the focal length of the entire optical system, is −0.31. In addition, the F-number Fno corresponding to the condition (8) is 2.06. The amount corresponding to the condition (9), which defines the chromatic aberration correction condition, is $3.94 \times 10^{-4}$. Furthermore, the half angle of view ω corresponding to the condition (10) is 9.22°.

In the fourth exemplary embodiment, the first lens unit L1 includes the positive lens made of a low dispersion glass material and the positive lens made of a high dispersion glass material to appropriately correct chromatic aberration. Accordingly, the fourth exemplary embodiment having the above-described configuration, in particular, a high aperture ratio of 2.06, can appropriately correct chromatic aberration, which is conspicuous in a middle focal length lens having a high aperture ratio as can be observed from the longitudinal aberration chart of FIG. 8. Furthermore, the fourth exemplary embodiment can appropriately correct various aberrations, such as spherical aberration and curvature of field.

The optical system OL according to the fifth exemplary embodiment will be described in detail below with reference to FIG. 9. Referring to FIG. 9, the optical system OL according to the fifth exemplary embodiment is a middle focal length lens having a high aperture ratio.

In the example illustrated in FIG. 9, the optical system OL includes, in order from the object side to the image side, the front lens group LF having a positive refractive power, the aperture stop SP, and the rear lens group LR having a positive refractive power.

The front lens group LF includes the first lens unit L1 having a positive refractive power. The rear lens group LR includes the second lens unit L2 having a negative refractive power and the third lens unit L3 having a positive refractive power. Focusing from an infinitely-distant object to a short-distance object is executed by moving the second lens unit L2 towards the image side.

The first lens unit L1 includes four positive lenses G1 through G3 and G6 and two negative lenses G4 and G5. The focal length of the first lens unit L1 is 145.77. The focal length of the entire optical system is 196.00 mm. The aperture ratio (Fno) is 2.05. The half angle of view ω is 6.30°.

In the first lens unit L1, the focal lengths of the positive lenses G1 through G3 and G6 are 467.27, 204.20, 120.63, and 97.59, respectively. S-NPH1 (a product of OHARA INC.) is used as the glass material of the positive lens G1. The refractive index Nd with respect to d-line light is 1.808. The Abbe number vd is 22.8.

The relative partial dispersion θgF is 0.630. The anomalous partial dispersion ΔθgF is 0.0067. M-FCD500 (a product of HOYA CORPORATION) is used as the glass material of the positive lenses G2 and G3. The refractive index Nd with respect to d-line light is 1.553. The Abbe number vd is 71.7. The relative partial dispersion θgF is 0.540. The anomalous partial dispersion ΔθgF is 0.0113.

FCD505 (a product of HOYA CORPORATION) is used as the glass material of the positive lens G6. The refractive index Nd with respect to d-line light is 1.593. The Abbe number vd is 68.6. The relative partial dispersion θgF is 0.545. The anomalous partial dispersion ΔθgF is 0.0132.

According to the fifth exemplary embodiment, the radius of curvature Rp of the refractive surface on the image side of the positive lens G6, which is provided closest to the image side among the lenses of the first lens unit L1, is 143.69. The radius of curvature Rn of the refractive surface on the object side of the positive lens G7, which is provided closest to the object side among the lenses of the second lens unit L2, is −549.02.

In the fifth exemplary embodiment, the ratio of the Abbe number vd corresponding to the condition (1) is 3.14. The minimum Abbe number and the minimum refractive index corresponding to the conditions (2) and (3) are 22.8 and 1.553, respectively. The value corresponding to the condition (4), which is a value calculated by dividing the focal length of the first lens unit L1 by the focal length of the entire optical system, is 0.74.

Furthermore, in the fifth exemplary embodiment, values corresponding to the conditions (5) and (6) are 0.73 and −2.80, respectively. The value corresponding to the condition (7), which is a value calculated by dividing the focal length of the air lens by the focal length of the entire optical system, is −0.89. In addition, the F-number Fno corresponding to the condition (8) is 2.05. The amount corresponding to the condition (9), which defines the chromatic aberration correction condition, is $6.82 \times 10^{-4}$. Furthermore, the half angle of view ω corresponding to the condition (10) is 6.30°.

In the fifth exemplary embodiment, the first lens unit L1 includes the positive lens made of a low dispersion glass material and the positive lens made of a high dispersion glass material to appropriately correct chromatic aberration. Accordingly, the fifth exemplary embodiment having the above-described configuration, in particular, a high aperture ratio of 2.05, can appropriately correct chromatic aberration, which is conspicuous in a middle focal length lens having a high aperture ratio as can be appreciated from the longitudinal aberration chart of FIG. 10. Furthermore, the fifth exemplary embodiment can appropriately correct various aberrations, such as spherical aberration and curvature of field.

The optical system OL according to the sixth exemplary embodiment will be described in detail below with reference to FIG. 11. Referring to FIG. 11, the optical system OL according to the sixth exemplary embodiment is a middle focal length lens having a high aperture ratio.

In the example illustrated in FIG. 11, the optical system OL includes, in order from the object side to the image side, the front lens group LF having a positive refractive power, the aperture stop SP, and the rear lens group LR having a positive refractive power.

The front lens group LF includes the first lens unit L1 having a positive refractive power. The rear lens group LR includes the second lens unit L2 having a positive refractive power. Focusing from an infinitely-distant object to a short-distance object is executed by moving the first lens unit L1, the aperture stop SP, and the second lens unit L2 towards the object side.

The first lens unit L1 includes three positive lenses G1 through G3 and one negative lens G4. The focal length of the first lens unit L1 is 181.39. The focal length of the entire optical system is 51.70 mm. The aperture ratio (Fno) is 1.41. The half angle of view ω is 22.71°.

In the first lens unit L1, the focal lengths of the positive lenses G1 through G3 are 222.34, 92.60, and 125.56, respectively. S-NBH55 (a product of OHARA INC.) is used as the glass material of the positive lens G1. The refractive index Nd with respect to d-line light is 1.800. The Abbe number vd is 29.8.

The relative partial dispersion θgF is 0.602. The anomalous partial dispersion ΔθgF is 0.0006. FCD505 (a product of HOYA CORPORATION) is used as the glass material of the positive lenses G2 and G3. The refractive index Nd with respect to d-line light is 1.593. The Abbe number vd is 68.6. The relative partial dispersion θgF is 0.545. The anomalous partial dispersion ΔθgF is 0.0132.

According to the sixth exemplary embodiment, the radius of curvature Rp of the refractive surface on the image side of the negative lens G4, which is provided closest to the image side among the lenses of the first lens unit L1, is 19.57. The radius of curvature Rn of the refractive surface on the object side of the negative lens G5, which is provided closest to the object side among the lenses of the second lens unit L2, is −19.02.

In the sixth exemplary embodiment, the ratio of the Abbe number vd corresponding to the condition (1) is 2.30. The minimum Abbe number and the minimum refractive index corresponding to the conditions (2) and (3) are 29.8 and 1.593, respectively. The value corresponding to the condition (4), which is a value calculated by dividing the focal length of the first lens unit L1 by the focal length of the entire optical system, is 3.51.

Furthermore, in the sixth exemplary embodiment, values corresponding to the conditions (5) and (6) are 0.38 and −0.37, respectively. The value corresponding to the condition (7), which is a value calculated by dividing the focal length of the air lens by the focal length of the entire optical system, is −0.20. In addition, the F-number Fno corresponding to the condition (8) is 1.41. The amount corresponding to the condition (9), which defines the chromatic aberration correction condition, is $6.73 \times 10^{-4}$. Furthermore, the half angle of view ω corresponding to the condition (10) is 22.71°.

In the sixth exemplary embodiment, the first lens unit L1 includes the positive lens made of a low dispersion glass material and the positive lens made of a high dispersion glass material to appropriately correct chromatic aberration.

Accordingly, the sixth exemplary embodiment having the above-described configuration, in particular, a high aperture ratio of 1.41, can appropriately correct chromatic aberration, which is conspicuous in a middle focal length lens having a high aperture ratio as can be elucidated from the longitudinal aberration chart of FIG. 12. Furthermore, the sixth exemplary embodiment can appropriately correct various aberrations, such as spherical aberration and curvature of field.

An exemplary embodiment of an image pickup apparatus is a digital still camera (optical apparatus) that uses the optical system according to each exemplary embodiment of the present invention as a photographic optical system thereof will be described below with reference to FIG. 13.

Referring to FIG. 13, the digital still camera includes a camera body 20 and a photographic optical system 21. The photographic optical system 21 includes an optical system according to any of the first through the sixth exemplary embodiments described above.

The camera body 20 includes a solid-state image sensor (photoelectric conversion element) 22, such as a CCD sensor or a CMOS sensor, configured to receive an object image formed by the photographic optical system 21.

The camera body also includes a memory 23, which records images and information about the object images that have been photoelectrically converted by the solid-state image sensor 22.

In addition, the camera body 20 also includes a viewfinder 24, which includes a liquid crystal display (LCD) panel and via which a user of the camera can observe the object image formed on the solid-state image sensor 22.

By applying the optical system according to each exemplary embodiment of the present invention to the optical apparatus, such as a digital still camera, the present invention can implement a small-size optical apparatus having a high optical performance. The optical system according to an exemplary embodiment of the present invention can also be applied as an optical system of an image pickup apparatus, such as an interchangeable lens system of a single-lens reflex camera.

Numerical examples 1 through 6, which respectively correspond to the first through the sixth exemplary embodiments of the present invention, are set forth below. In each of the numerical examples 1 through 6, "i" denotes the order counted from the object side towards the image side. The surface number "i" is counted starting with the surface of a lens farthest towards the object side (i.e., closest to the object plane). "Ri" denotes a radius of curvature of an i-th optical surface (the i-th surface) in units of millimeter, "Di" (mm) denotes an axial space between the i-th surface and the (i+1)-th surface, "Ndi" and "vdi" respectively denote a refractive index and an Abbe number of a medium (material) between the i-th surface and the (i+1)-th surface with respect to d-line light. "θgFi" denotes a partial dispersion value of the medium between the i-th surface and the (i+1)-th surface. "BF" denotes the back focus. The lens total length is equivalent to the distance from the first lens surface to the image plane. An aspheric shape is represented by adding an asterisk "*" to the surface number.

In addition, "K" denotes a conic constant and each of "B", "C", "D", "E", and the like denotes an aspheric coefficient for each corresponding order. The aspheric shape is expressed as $$X(h)=\{(1/r)h^2\}/[1+\{1-(1+K)(h/r)^2\}^{1/2}]+Bh^4+Ch^6+Dh^8+Eh^{10}\ldots$$

where "X" denotes a displacement from a surface vertex along the optical axis in a position at a height "h" from the optical axis, and "r" denotes a paraxial radius of curvature.

The scientific notation "e±XX" for each aspheric coefficient is equivalent to the exponential notation "$1\times10^{\pm XX}$". In the lens unit data, the aperture stop is expressed as one lens unit (the second lens unit). Accordingly, in each numerical example, the number of lens units is greater than the number of the lens units described above by one. The relationship between each condition described above and each numerical example is set forth in Table 1.

Numerical Example 1

| Unit: mm | | | | | |
|---|---|---|---|---|---|
| Surface Data | | | | | |

| Surface No. | R | D | Nd | vd | θgF | Light Effective Diameter |
|---|---|---|---|---|---|---|
| 1 | 96.365 | 3.50 | 1.84666 | 23.9 | 0.620 | 68.55 |
| 2 | 151.535 | 0.15 | | | | 68.18 |
| 3 | 69.419 | 11.83 | 1.56907 | 71.3 | 0.545 | 66.99 |
| 4 | 351.642 | 0.15 | | | | 64.45 |
| 5* | 46.412 | 18.00 | 1.56907 | 71.3 | 0.545 | 57.87 |
| 6 | 194.777 | 0.50 | | | | 48.18 |
| 7 | 260.486 | 6.15 | 1.78472 | 25.7 | 0.616 | 48.00 |
| 8 | 27.078 | 10.38 | | | | 37.16 |
| 9(Stop) | ∞ | 8.55 | | | | 36.50 |
| 10 | −31.709 | 2.70 | 1.72047 | 34.7 | 0.583 | 35.84 |
| 11 | 68.553 | 10.47 | 1.83481 | 42.7 | 0.564 | 40.74 |
| 12 | −47.485 | 0.15 | | | | 41.65 |
| 13 | 257.579 | 4.90 | 1.88300 | 40.8 | 0.567 | 40.84 |
| 14 | −100.054 | 1.00 | | | | 40.53 |
| 15 | 571.442 | 1.80 | 1.65412 | 39.7 | 0.574 | 38.13 |
| 16 | 50.418 | 6.70 | 1.80400 | 46.6 | 0.557 | 38.01 |
| 17 | 2016.573 | 39.13 | | | | 38.22 |
| Image plane | ∞ | | | | | |

| Aspheric Coefficients | |
|---|---|
| r5 | K = 0.00000E+00    B = −1.12513E−07    C = −9.79428E−11 |
|    | D = 5.86614E−14    E = −9.26299E−17 |

| Various Data | |
|---|---|
| Focal Length | 85.00 |
| Fno | 1.24 |
| Image Height | 21.64 |
| Lens Total Length | 126.06 |
| BF | 39.13 |
| Entrance Pupil Position | 74.83 |
| Exit Pupil Position | −40.01 |
| Front Principal Point Position | 68.54 |
| Rear Principal Point Position | −45.87 |

| Various Data of Each Unit | | | | | |
|---|---|---|---|---|---|
| Lens unit | First surface | Focal length | Lens Config. Length | Front Principal Point Position | Rear Principal Point Position |
| 1 | 1 | 234.92 | 40.28 | −133.07 | −99.92 |
| 2 | 9 | ∞ | 0 | 0 | 0 |
| 3 | 10 | 74.61 | 18.21 | 17.92 | 10.97 |
| 4 | 15 | 268.69 | 8.5 | 0.36 | −4.44 |

| Various Data of Each Lens | | |
|---|---|---|
| Lens unit | First surface | Focal length |
| 1 | 1 | 303.780 |
| 2 | 3 | 149.720 |

-continued

Unit: mm

| | | |
|---|---|---|
| 3 | 5 | 102.560 |
| 4 | 7 | −38.960 |
| 5 | 10 | −29.760 |
| 6 | 11 | 35.040 |
| 7 | 13 | 82.140 |
| 8 | 15 | −84.650 |
| 9 | 16 | 64.220 |

Numerical Example 2

Unit: mm

Surface Data

| Surface No. | R | D | Nd | vd | θgF | Light Effective Diameter |
|---|---|---|---|---|---|---|
| 1 | 185.977 | 2.36 | 1.84666 | 23.9 | 0.620 | 51.30 |
| 2 | 1560.254 | 0.20 | | | | 50.98 |
| 3 | 47.954 | 7.17 | 1.56907 | 71.3 | 0.545 | 46.45 |
| 4 | 1255.150 | 0.15 | | | | 45.25 |
| 5 | 32.139 | 7.60 | 1.56907 | 71.3 | 0.545 | 39.75 |
| 6 | 226.918 | 0.15 | | | | 38.14 |
| 7 | 369.606 | 1.88 | 1.71736 | 29.5 | 0.605 | 38.43 |
| 8 | 27.048 | 8.52 | | | | 32.23 |
| 9(Stop) | ∞ | 3.82 | | | | 30.38 |
| 10 | −72.482 | 2.06 | 1.84666 | 23.9 | 0.620 | 29.02 |
| 11 | −38.716 | 1.34 | 1.53172 | 48.8 | 0.563 | 28.94 |
| 12 | 37.918 | 16.56 | | | | 26.93 |
| 13 | −226.944 | 1.64 | 1.71736 | 29.5 | 0.605 | 28.71 |
| 14 | 34.288 | 11.20 | 1.80400 | 46.6 | 0.557 | 32.44 |
| 15 | −820.164 | 0.49 | | | | 35.91 |
| 16* | 70.556 | 5.53 | 1.83481 | 42.7 | 0.564 | 38.96 |
| 17 | −118.727 | 42.34 | | | | 39.22 |
| Image plane | ∞ | | | | | |

Aspheric Coefficients

| r16 | K = 0.00000E+00 | B = −8.12983E−07 |
|---|---|---|
| | C = −1.01491E−09 | D = 2.41503E−12 |
| | E = −2.18565E−15 | |

Various Data

| | |
|---|---|
| Focal Length | 85.00 |
| Fno | 1.80 |
| Image Height | 21.64 |
| Lens Total Length | 113.00 |
| BF | 42.34 |
| Entrance Pupil Position | 34.52 |
| Exit Pupil Position | −77.49 |
| Front Principal Point Position | 59.23 |
| Rear Principal Point Position | −42.66 |

Various Data of Each Unit

| Lens unit | First surface | Focal length | Lens Config. Length | Front Principal Point Position | Rear Principal Point Position |
|---|---|---|---|---|---|
| 1 | 1 | 83.82 | 19.5 | −15.7 | −22.88 |
| 2 | 9 | ∞ | 0 | 0 | 0 |
| 3 | 10 | −56.54 | 3.4 | 1.06 | −0.91 |
| 4 | 13 | 52.38 | 18.85 | 9.03 | −1.58 |

Various Data of Each Lens

| Lens | First | Focal |

-continued

Unit: mm

| unit | surface | length |
|---|---|---|
| 1 | 1 | 249.190 |
| 2 | 3 | 87.430 |
| 3 | 5 | 64.880 |
| 4 | 7 | −40.780 |
| 5 | 10 | 95.490 |
| 6 | 11 | −35.810 |
| 7 | 13 | −41.410 |
| 8 | 14 | 41.180 |
| 9 | 16 | 53.730 |

Numerical Example 3

Unit: mm

Surface Data

| Surface No. | R | D | Nd | vd | θgF | Light Effective Diameter |
|---|---|---|---|---|---|---|
| 1 | 138.034 | 3.52 | 1.84666 | 23.9 | 0.620 | 50.00 |
| 2 | 738.082 | 0.15 | | | | 49.72 |
| 3 | 47.229 | 6.86 | 1.59282 | 68.6 | 0.545 | 48.12 |
| 4 | 227.689 | 0.15 | | | | 47.24 |
| 5 | 35.260 | 7.38 | 1.59282 | 68.6 | 0.545 | 42.31 |
| 6 | 155.898 | 0.89 | | | | 40.57 |
| 7 | 196.102 | 2.91 | 1.76182 | 26.5 | 0.614 | 39.58 |
| 8 | 26.967 | 8.51 | | | | 32.67 |
| 9(Stop) | ∞ | 3.18 | | | | 31.04 |
| 10 | −127.145 | 2.49 | 1.84666 | 23.9 | 0.620 | 29.78 |
| 11 | −59.326 | 2.00 | 1.51742 | 52.4 | 0.556 | 29.52 |
| 12 | 40.977 | 17.86 | | | | 27.46 |
| 13 | 120.512 | 2.00 | 1.84666 | 23.9 | 0.620 | 25.90 |
| 14 | 32.454 | 5.89 | 1.80400 | 46.6 | 0.557 | 27.22 |
| 15 | 108.894 | 7.18 | | | 28.53 | |
| 16 | 73.726 | 6.76 | 1.90366 | 31.3 | 0.595 | 36.38 |
| 17 | −185.255 | 42.27 | | | | 37.00 |
| Image plane | ∞ | | | | | |

Various Data

| | |
|---|---|
| Focal Length | 100.00 |
| Fno | 2.00 |
| Image Height | 21.64 |
| Lens Total Length | 120.00 |
| BF | 42.27 |
| Entrance Pupil Position | 38.62 |
| Exit Pupil Position | −80.29 |
| Front Principal Point Position | 57.03 |
| Rear Principal Point Position | −57.73 |

Various Data of Each Unit

| Lens unit | First surface | Focal length | Lens Config. Length | Front Principal Point Position | Rear Principal Point Position |
|---|---|---|---|---|---|
| 1 | 1 | 93.92 | 21.86 | −22.74 | −28.6 |
| 2 | 9 | ∞ | 0 | 0 | 0 |
| 3 | 10 | −72.37 | 4.49 | 1.89 | −0.75 |
| 4 | 13 | 65.73 | 21.83 | 12.07 | −3.51 |

Various Data of Each Lens

| Lens unit | First surface | Focal length |

-continued

Unit: mm

| | | |
|---|---|---|
| 1 | 1 | 200.000 |
| 2 | 3 | 99.120 |
| 3 | 5 | 75.150 |
| 4 | 7 | −41.350 |
| 5 | 10 | 129.190 |
| 6 | 11 | −46.530 |
| 7 | 13 | −53.010 |
| 8 | 14 | 55.590 |
| 9 | 16 | 59.090 |

Numerical Example 4

Unit: mm

Surface Data

| Surface No. | R | D | Nd | vd | θgF | Light Effective Diameter |
|---|---|---|---|---|---|---|
| 1 | 69.402 | 10.56 | 1.59282 | 68.6 | 0.545 | 65.55 |
| 2 | −1157.708 | 0.15 | | | | 64.65 |
| 3 | 69.524 | 5.89 | 1.84666 | 23.9 | 0.620 | 59.14 |
| 4 | 181.327 | 1.78 | | | | 57.86 |
| 5 | 558.435 | 3.50 | 1.80000 | 29.8 | 0.602 | 57.62 |
| 6 | 32.649 | 13.67 | 1.55332 | 71.7 | 0.540 | 48.43 |
| 7 | 310.611 | 0.15 | | | | 46.60 |
| 8 | 25.606 | 3.50 | 1.51633 | 64.1 | 0.535 | 40.39 |
| 9 | 23.843 | 11.87 | | | | 37.27 |
| 10(Stop) | ∞ | 3.26 | | | | 35.25 |
| 11 | −387.775 | 7.83 | 1.84666 | 23.9 | 0.620 | 33.22 |
| 12 | −37.589 | 2.00 | 1.79952 | 42.2 | 0.567 | 31.73 |
| 13 | 45.068 | 21.84 | | | | 28.91 |
| 14 | −55.751 | 2.00 | 1.75520 | 27.5 | 0.610 | 27.33 |
| 15 | 73.482 | 9.26 | 1.80400 | 46.6 | 0.557 | 30.77 |
| 16 | −55.518 | 1.57 | | | | 33.82 |
| 17 | 83.836 | 8.21 | 1.88300 | 40.8 | 0.567 | 37.55 |
| 18 | −1879.098 | 51.86 | | | | 38.00 |
| Image plane | ∞ | | | | | |

Various Data

| | |
|---|---|
| Focal Length | 133.30 |
| Fno | 2.06 |
| Image Height | 21.64 |
| Lens Total Length | 158.90 |
| BF | 51.86 |
| Entrance Pupil Position | 70.91 |
| Exit Pupil Position | −104.51 |
| Front Principal Point Position | 90.57 |
| Rear Principal Point Position | −81.44 |

Various Data of Each Unit

| Lens unit | First surface | Focal length | Lens Config. Length | Front Principal Point Position | Rear Principal Point Position |
|---|---|---|---|---|---|
| 1 | 1 | 96.42 | 39.2 | −14.26 | −33.35 |
| 2 | 10 | ∞ | 0 | 0 | 0 |
| 3 | 11 | −53.08 | 9.83 | 4.75 | −0.55 |
| 4 | 14 | 68.43 | 21.04 | 12.18 | 1.06 |

Various Data of Each Lens

| Lens unit | First surface | Focal length |
|---|---|---|
| 1 | 1 | 110.800 |

-continued

Unit: mm

| | | |
|---|---|---|
| 2 | 3 | 130.040 |
| 3 | 5 | −43.470 |
| 4 | 6 | 64.800 |
| 5 | 8 | −2069.500 |
| 6 | 11 | 48.660 |
| 7 | 12 | −25.360 |
| 8 | 14 | −41.700 |
| 9 | 15 | 40.630 |

Numerical Example 5

Unit: mm

Surface Data

| Surface No. | R | D | Nd | vd | θgF | Light Effective Diameter |
|---|---|---|---|---|---|---|
| 1 | 244.543 | 5.32 | 1.80809 | 22.8 | 0.631 | 95.61 |
| 2 | 687.255 | 11.15 | | | | 95.21 |
| 3 | 94.528 | 13.49 | 1.55332 | 71.7 | 0.540 | 90.81 |
| 4 | 549.175 | 1.57 | | | | 88.94 |
| 5 | 69.360 | 16.60 | 1.55332 | 71.7 | 0.540 | 80.00 |
| 6 | −1621.211 | 0.24 | | | | 76.73 |
| 7 | −1485.693 | 4.10 | 1.65412 | 39.7 | 0.574 | 76.36 |
| 8 | 54.425 | 4.00 | | | | 63.48 |
| 9 | 77.744 | 3.50 | 1.80610 | 33.3 | 0.588 | 63.21 |
| 10 | 42.647 | 13.11 | 1.59282 | 68.6 | 0.545 | 57.64 |
| 11 | 143.687 | 7.66 | | | | 55.05 |
| 12(Stop) | ∞ | 6.71 | | | | 51.67 |
| 13 | −549.022 | 4.48 | 1.84666 | 23.9 | 0.620 | 47.48 |
| 14 | −213.667 | 2.40 | 1.51742 | 52.4 | 0.556 | 46.33 |
| 15 | 54.543 | 27.69 | | | | 42.86 |
| 16 | 191.780 | 2.00 | 1.84666 | 23.9 | 0.620 | 37.48 |
| 17 | 34.120 | 9.91 | 1.83481 | 42.7 | 0.564 | 36.17 |
| 18 | −317.293 | 2.50 | | | | 35.30 |
| 19 | −1019.681 | 8.60 | 1.84666 | 23.9 | 0.620 | 35.14 |
| 20 | −35.399 | 2.03 | 1.80610 | 33.3 | 0.588 | 35.28 |
| 21 | 62.163 | 8.36 | | | | 35.41 |
| 22 | 72.771 | 11.17 | 1.83400 | 37.2 | 0.578 | 40.08 |
| 23 | −39.474 | 2.30 | 1.80400 | 46.6 | 0.557 | 40.12 |
| 24 | −638.374 | 2.41 | | | | 40.08 |
| 25 | ∞ | 2.20 | 1.51633 | 64.1 | 0.535 | 39.92 |
| 26 | ∞ | 50.00 | | | | 50.00 |
| Image plane | ∞ | | | | | |

Various Data

| | |
|---|---|
| Focal Length | 196.00 |
| Fno | 2.05 |
| Image Height | 21.64 |
| Lens Total Length | 223.50 |
| BF | 50.00 |
| Entrance Pupil Position | 107.85 |
| Exit Pupil Position | −127.17 |
| Front Principal Point Position | 87.02 |
| Rear Principal Point Position | −146.00 |

Various Data of Each Unit

| Lens unit | First surface | Focal length | Lens Config. Length | Front Principal Point Position | Rear Principal Point Position |
|---|---|---|---|---|---|
| 1 | 1 | 145.77 | 73.08 | −23.61 | −61.46 |
| 2 | 12 | ∞ | 0 | 0 | 0 |
| 3 | 13 | −105.07 | 6.88 | 3.6 | −0.39 |
| 4 | 16 | 127.27 | 51.47 | 22.38 | −14.18 |

-continued

Unit: mm

Various Data of Each Lens

| Lens unit | First surface | Focal length |
|---|---|---|
| 1 | 1 | 467.270 |
| 2 | 3 | 204.200 |
| 3 | 5 | 120.630 |
| 4 | 7 | −80.180 |
| 5 | 9 | −122.650 |
| 6 | 10 | 97.590 |
| 7 | 13 | 410.640 |
| 8 | 14 | −83.720 |
| 9 | 16 | −49.310 |
| 10 | 17 | 37.380 |
| 11 | 19 | 43.140 |
| 12 | 20 | −27.720 |
| 13 | 22 | 32.140 |
| 14 | 23 | −52.420 |
| 15 | 25 | 0.000 |

Numerical Example 6

Unit: mm

Surface Data

| Surface No. | R | D | Nd | vd | θgF | Light Effective Diameter |
|---|---|---|---|---|---|---|
| 1 | 79.128 | 2.61 | 1.80000 | 29.8 | 0.602 | 38.73 |
| 2 | 140.443 | 0.15 | | | | 37.71 |
| 3 | 50.901 | 5.25 | 1.59282 | 68.6 | 0.55 | 36.06 |
| 4 | 672.458 | 0.15 | | | | 35.24 |
| 5 | 27.169 | 5.11 | 1.59282 | 68.6 | 0.545 | 32.24 |
| 6 | 39.794 | 2.05 | | | | 29.84 |
| 7 | 107.583 | 1.80 | 1.58144 | 40.8 | 0.577 | 29.68 |
| 8 | 19.565 | 6.99 | | | | 25.88 |
| 9(Stop) | ∞ | 8.70 | | | | 25.76 |
| 10 | −19.019 | 3.48 | 1.84666 | 23.8 | 0.620 | 25.79 |
| 11 | −160.342 | 5.98 | 1.77250 | 49.6 | 0.552 | 31.80 |
| 12 | −29.577 | 0.15 | | | | 33.15 |
| 13 | −198.696 | 4.98 | 1.88300 | 40.8 | 0.567 | 35.07 |
| 14 | −37.980 | 0.15 | | | | 35.49 |
| 15 | 101.178 | 3.38 | 1.77250 | 49.6 | 0.552 | 34.02 |
| 16 | −439.751 | 39.00 | | | | 34.26 |
| Image plane | ∞ | | | | | |

Various Data

| | |
|---|---|
| Focal Length | 51.70 |
| Fno | 1.41 |
| Image Height | 21.64 |
| Lens Total Length | 89.92 |
| BF | 39.00 |
| Entrance Pupil Position | 28.46 |
| Exit Pupil Position | −47.37 |
| Front Principal Point Position | 49.22 |
| Rear Principal Point Position | −12.70 |

Various Data of Each Unit

| Lens unit | First surface | Focal length | Lens Config. Length | Front Principal Point Position | Rear Principal Point Position |
|---|---|---|---|---|---|
| 1 | 1 | 181.39 | 17.11 | −49.73 | −47.64 |

-continued

Unit: mm

| | | | | | |
|---|---|---|---|---|---|
| 2 | 9 | ∞ | 0 | 0 | 0 |
| 3 | 10 | 41.02 | 18.12 | 15.16 | 9.67 |

Various Data of Each Lens

| Lens unit | First surface | Focal length |
|---|---|---|
| 1 | 1 | 222.340 |
| 2 | 3 | 92.600 |
| 3 | 5 | 125.560 |
| 4 | 7 | −41.440 |
| 5 | 10 | −25.780 |
| 6 | 11 | 46.030 |
| 7 | 13 | 52.410 |
| 8 | 15 | 106.770 |

TABLE 1

| | Numerical Examples | | |
|---|---|---|---|
| | 1 | 2 | 3 |
| vd1 | 23.9 (G1) | 23.9 (G1) | 23.9 (G1) |
| vd2 | 71.3 (G2) | 71.3 (G2) | 68.6 (G2) |
| vd3 | 71.3 (G3) | 71.3 (G3) | 68.6 (G3) |
| vd4 | — | — | — |
| N1 | 1.84666 (G1) | 1.84666 (G1) | 1.84666 (G1) |
| N2 | 1.56907 (G2) | 1.56907 (G2) | 1.59282 (G2) |
| N3 | 1.56907 (G3) | 1.56907 (G3) | 1.59282 (G3) |
| N4 | — | — | — |
| θgF1 | 0.620 (G1) | 0.620 (G1) | 0.620 (G1) |
| θgF2 | 0.545 (G2) | 0.545 (G2) | 0.545 (G2) |
| θgF3 | 0.545 (G3) | 0.545 (G3) | 0.545 (G3) |
| θgF4 | — | — | — |
| ΔθgF1 | −0.0003 (G1) | −0.0003 (G1) | −0.0003 (G1) |
| ΔθgF2 | 0.0159 (G2) | 0.0159 (G2) | 0.0132 (G2) |
| ΔθgF3 | 0.0159 (G3) | 0.0159 (G3) | 0.0132 (G3) |
| ΔθgF4 | — | — | — |
| f1 | 303.78 (G1) | 249.19 (G1) | 200.00 (G1) |
| f2 | 149.72 (G2) | 87.43 (G2) | 99.12 (G2) |
| f3 | 102.56 (G3) | 64.88 (G3) | 75.15 (G3) |
| f4 | — | — | — |
| f | 85.00 | 85.00 | 100.00 |
| fp | 234.92 | 83.82 | 93.92 |
| fair | −15.58 | −23.80 | −26.95 |
| Rp | 27.08 | 27.05 | 26.97 |
| Rn | −31.71 | −72.48 | −127.15 |
| Cond. (1) | 2.98 | 2.98 | 2.87 |
| Cond. (2) | 23.9 | 23.9 | 23.9 |
| Cond. (3) | 1.56907 | 1.56907 | 1.59282 |
| Cond. (4) | 2.76 | 0.99 | 0.94 |
| Cond. (5) | 0.32 | 0.32 | 0.27 |
| Cond. (6) | −0.37 | −0.85 | −1.27 |
| Cond. (7) | −0.18 | −0.28 | −0.27 |
| Cond. (8) | 1.24 | 1.80 | 2.00 |
| Cond. (9) | 8.54E−04 | 4.99E−04 | 4.19E−04 |
| Cond. (10) | 14.28° | 14.28° | 12.21° |

| | Numerical Examples | | |
|---|---|---|---|
| | 4 | 5 | 6 |
| vd1 | 68.6 (G1) | 22.8 (G1) | 29.8 (G1) |
| vd2 | 23.9 (G2) | 71.7 (G2) | 68.6 (G2) |
| vd3 | 71.7 (G3) | 71.7 (G3) | 68.6 (G3) |
| vd4 | — | 68.6 (G6) | — |
| N1 | 1.59282 (G1) | 1.80809 (G1) | 1.80000 (G1) |
| N2 | 1.84666 (G2) | 1.55332 (G2) | 1.59282 (G2) |
| N3 | 1.55332 (G3) | 1.55332 (G3) | 1.59282 (G3) |
| N4 | — | 1.59282 (G6) | — |
| θgF1 | 0.545 (G1) | 0.631 (G1) | 0.602 (G1) |
| θgF2 | 0.620 (G2) | 0.540 (G2) | 0.545 (G2) |
| θgF3 | 0.540 (G4) | 0.540 (G3) | 0.545 (G3) |
| θgF4 | — | 0.545 (G6) | — |

TABLE 1-continued

| | | | |
|---|---|---|---|
| ΔθgF1 | 0.0132 (G1) | 0.0067 (G1) | −0.0006 (G1) |
| ΔθgF2 | −0.0003 (G2) | 0.0113 (G2) | 0.0132 (G2) |
| ΔθgF3 | 0.0113 (G4) | 0.0113 (G3) | 0.0132 (G3) |
| ΔθgF4 | — | 0.0132 (G6) | — |
| f1 | 110.80 (G1) | 467.27 (G1) | 222.34 (G1) |
| f2 | 130.04 (G2) | 204.20 (G2) | 92.60 (G2) |
| f3 | 64.80 (G4) | 120.63 (G3) | 125.56 (G3) |
| f4 | — | 97.59 (G6) | — |
| f | 133.30 | 196.00 | 51.70 |
| fp | 96.42 | 145.77 | 181.39 |
| fair | −40.73 | −173.63 | −10.53 |
| Rp | 23.84 | 143.69 | 19.57 |
| Rn | −387.78 | −549.02 | −19.02 |
| Cond. (1) | 3.00 | 3.14 | 2.30 |
| Cond. (2) | 23.9 | 22.8 | 29.8 |
| Cond. (3) | 1.55332 | 1.55332 | 1.59282 |
| Cond. (4) | 0.72 | 0.74 | 3.51 |
| Cond. (5) | 0.18 | 0.73 | 0.38 |
| Cond. (6) | −2.91 | −2.80 | −0.37 |
| Cond. (7) | −0.31 | −0.89 | −0.20 |
| Cond. (8) | 2.06 | 2.05 | 1.41 |
| Cond. (9) | 3.94E−04 | 6.82E−04 | 6.73E−04 |
| Cond. (10) | 9.22° | 6.30° | 22.71° |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-126815 filed Jun. 2, 2010, which is hereby incorporated by reference herein in its entirety.

What is claimed is:

1. An optical system comprising, in order from an object side to an image side:
a first lens unit having a positive refractive power;
an aperture stop; and
a rear lens group,
wherein the rear lens group includes a second lens unit configured to move during focusing,
wherein the first lens unit includes n positive lenses (n is an integer greater than 1) and one or more negative lenses, and
wherein, when i (i is an integer equal to or greater than 1) is an order of an optical member counted from the object side to the image side, Ndi and νdi are respectively a refractive index and an Abbe number of a material of an i-th positive lens of the first lens unit with respect to d-line light, max(νdi) and min (νdi) are respectively maximum and minimum values of the Abbe number νdi, min(Ndi) is a minimum value of the refractive index Ndi, fp is a focal length of the first lens unit, and f is a focal length of the entire optical system, the following conditions are satisfied:

$2.2 < \max(\nu di)/\min(\nu di)$ $\min(\nu di) < 30.0$ $1.55 < \min(Ndi)$ $0.5 < fp/f < 3.7.$ 2. The optical system according to claim 1, wherein, when Fno is a full-aperture F-number of the optical system during focusing on an infinitely-distant object, the following condition is satisfied:

$Fno < 2.5.$

3. The optical system according to claim 1, wherein when ΔθgFi is anomalous partial dispersion of the material of the i-th positive lens of the first lens unit and fi is a focal length of the i-th positive lens, the following condition is satisfied:

$3.60 \times 10^{-4} < \Sigma((\Delta\theta gFi/\nu di)/fi) \times fp.$

4. The optical system according to claim 1, wherein the rear lens group further includes a third lens unit located on the image side of the second lens unit and configured to be stationary during focusing.

5. The optical system according to claim 1, wherein the optical system is configured to form an image on a photoelectric conversion element located at an image plane of the optical system.

6. An image pickup apparatus comprising:
the optical system according to claim 1; and
a photoelectric conversion element configured to receive an image formed by the optical system.

7. The image pickup apparatus according to claim 6, wherein when ω is a half angle of view of the optical system, the following condition is satisfied:

$6 < \omega < 25.$

8. An optical system comprising, in order from an object side to an image side:
a first lens unit having a positive refractive power, whose a refractive surface closest to the image side has a concave shape facing the image side;
an aperture stop; and
a rear lens group,
wherein the rear lens group includes a second lens unit configured to move during focusing and whose refractive surface closest to the object side has a concave shape facing the object side,
wherein the first lens unit includes n positive lenses (n is an integer greater than 1) and one or more negative lenses, and
wherein, when i (i is an integer equal to or greater than 1) is an order of an optical member counted from the object side towards the image side, νdi is an Abbe number of a material of an i-th positive lens of the first lens unit with respect to d-line light, max(νdi) and min(νdi) are respectively maximum and minimum values of the Abbe number νdi, Rp is a radius of curvature of the refractive surface of the first lens unit closest to the image side and having a concave shape facing the image side, and Rn is a radius of curvature of the refractive surface of the second lens unit closest to the object side and having a concave shape facing the object side, and f is a focal length of the entire optical system, the following conditions are satisfied:

$2.2 < \max(\nu di)/\min(\nu di)$ $\min(\nu di) < 30.0$ $0.15 < Rp/f < 0.90$ $-15.00 < Rn/f < -0.15.$ 9. The optical system according to claim 8, wherein, when fair is a focal length of an air lens formed with refractive surfaces located at the object side and the image side of the aperture stop, the following condition is satisfied:

$-0.900 < \text{fair}/f < -0.175.$

10. The optical system according to claim 8, wherein, when Fno is a full-aperture F-number of the optical system during focusing on an infinitely-distant object, the following condition is satisfied:

$$Fno < 2.5.$$

11. The optical system according to claim 8, wherein, when $\Delta\theta gFi$ is anomalous partial dispersion of the material of the i-th positive lens of the first lens unit, $\nu di$ is the Abbe number of the material of the i-th positive lens, $fi$ is a focal length of the i-th positive lens and $fp$ is a focal length of the first lens unit, the following condition is satisfied:

$$3.60 \times 10^{-4} < \Sigma((\Delta\theta gFi/\nu di)/fi) \times fp.$$

12. The optical system according to claim 8, wherein the rear lens group further includes a third lens unit located on the image side of the second lens unit and configured to be stationary during focusing.

13. The optical system according to claim 8, wherein the optical system is configured to form an image on a photoelectric conversion element located at an image plane of the optical system.

14. An image pickup apparatus comprising:
the optical system according to claim 8; and
a photoelectric conversion element configured to receive an image formed by the optical system.

15. The image pickup apparatus according to claim 14, wherein when $\omega$ is a half angle of view of the optical system, the following condition is satisfied:

$$6 < \omega < 25.$$

* * * * *